(12) United States Patent
Jeon et al.

(10) Patent No.: US 9,787,971 B2
(45) Date of Patent: Oct. 10, 2017

(54) DEPTH SENSING METHOD, 3D IMAGE GENERATION METHOD, 3D IMAGE SENSOR, AND APPARATUS INCLUDING THE SAME

(71) Applicant: SAMSUNG ELECTRONICS CO., LTD., Suwon-si (KR)

(72) Inventors: Myungjae Jeon, Yongin-si (KR); Yonghwa Park, Yongin-si (KR); Jangwoo You, Seoul (KR); Heesun Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 14/753,777

(22) Filed: Jun. 29, 2015

(65) Prior Publication Data
US 2016/0142701 A1 May 19, 2016

(30) Foreign Application Priority Data
Nov. 13, 2014 (KR) ........................ 10-2014-0158064

(51) Int. Cl.
*G01C 3/08* (2006.01)
*H04N 13/02* (2006.01)
(Continued)

(52) U.S. Cl.
CPC ....... *H04N 13/0271* (2013.01); *G01S 7/4816* (2013.01); *G01S 7/4913* (2013.01);
(Continued)

(58) Field of Classification Search
CPC ........... H04N 13/0271; H04N 13/0207; H04N 13/0253; H04N 2213/005; G01S 7/4816; G01S 7/4913; G01S 17/89
See application file for complete search history.

(56) References Cited

U.S. PATENT DOCUMENTS 7,620,082 B2  11/2009  Van Der Veer
2008/0164954 A1  7/2008  Kim
(Continued)

FOREIGN PATENT DOCUMENTS

DE  10 2011 078 338 A1  1/2013
EP  1107455 A1  6/2001
(Continued)

OTHER PUBLICATIONS

Richard M. Conroy, et al.; "A Poer-Saving Modulation Technique for Time-of-Flight Range Imaging Sensors"; Proc. of SPIE; vol. 8085; Jun. 21, 2011; pp. 808506-1-808506-13; 13 total pgs.
(Continued)

*Primary Examiner* — Samantha K Abraham
(74) *Attorney, Agent, or Firm* — Sughrue Mion, PLLC

(57) ABSTRACT

A three-dimensional (3D) image sensor module including: an oscillator configured to output a distortion-compensated oscillation frequency as a driving voltage of a sine wave biased with a bias voltage; an optical shutter configured to vary transmittance of reflective light reflected from a subject, according to the driving voltage, and to modulate the reflective light into at least two optical modulation signals having different phases; and an image generator configured to generate image data about the subject, the image data including depth information that is calculated based on a difference between the phases of the at least two optical modulation signals.

33 Claims, 23 Drawing Sheets

(51) Int. Cl.
    *G01S 17/89*      (2006.01)
    *G01S 7/481*      (2006.01)
    *G01S 7/491*      (2006.01)

(52) U.S. Cl.
    CPC ......... *G01S 17/89* (2013.01); *H04N 13/0207* (2013.01); *H04N 13/0253* (2013.01); *H04N 2213/005* (2013.01)

(56) References Cited

U.S. PATENT DOCUMENTS

| | | | |
|---|---|---|---|
| 2010/0194463 A1* | 8/2010 | Moon | H02M 1/32 327/427 |
| 2010/0295626 A1 | 11/2010 | Kim et al. | |
| 2013/0336012 A1* | 12/2013 | Broussev | H02M 1/15 363/16 |
| 2014/0055565 A1 | 2/2014 | You et al. | |
| 2014/0291613 A1* | 10/2014 | Lin | H01L 33/06 257/14 |

FOREIGN PATENT DOCUMENTS

| | | |
|---|---|---|
| JP | 2002-250955 A | 9/2002 |
| JP | 2004-309584 A | 11/2004 |
| JP | 4034412 B2 | 1/2008 |
| KR | 10-2011-0071555 A | 6/2011 |
| KR | 10-1082049 B1 | 11/2011 |
| KR | 10-2014-0034856 A | 3/2014 |

OTHER PUBLICATIONS

Communication dated Apr. 7, 2016, issued by the European Patent Office in counterpart European Application No. 15177283.7.
Paul Scherz, "Practical Electronics for Inventors", Practical Electronics for Inventors, Jan. 1, 2000, McGraw-Hill, US, Total 625 pages, XP055232920.
Jan Ebert & Marian Kazimierczuk, "Class E High-Efficiency Tuned Power Oscillator", IEEE Journal of Solid-State Circuits, vol. SC-16, No. 2, Apr. 1, 1981, pp. 62-66, XP001461922.

* cited by examiner

DEPTH SENSING METHOD, 3D IMAGE GENERATION METHOD, 3D IMAGE SENSOR, AND APPARATUS INCLUDING THE SAME

RELATED APPLICATIONS

This application claims the benefit of Korean Patent Application No. 10-2014-0158064, filed on Nov. 13, 2014, in the Korean Intellectual Property Office, the disclosure of which is incorporated herein by reference in its entirety.

BACKGROUND

1. Field

Aspects of one or more exemplary embodiment relate to a three-dimensional (3D) image sensor module and an electronic apparatus including the 3D image sensor module.

2. Description of the Related Art

Depth information associated with a distance between a sensor module for generating a three-dimensional (3D) image and a subject may be calculated by a method of measuring time of flight (TOF) of light. Using the method of measuring TOF, the depth information may be calculated by modulating light reflected from a subject.

SUMMARY

Provided are three-dimensional (3D) image sensor modules capable of reducing power consumption or generating an accurate image, and electronic apparatuses including the 3D image sensor modules.

Additional aspects will be set forth in part in the description which follows and, in part, will be apparent from the description, or may be learned by practice of one or more exemplary embodiments.

According to an aspect of one or more exemplary embodiments, there is provided a 3D image sensor module including: an oscillator configured to output a distortion-compensated oscillation frequency as a driving voltage of a sine wave biased with a bias voltage; an optical shutter configured to vary transmittance of reflective light reflected from a subject, according to the driving voltage, and to modulate the reflective light into at least two optical modulation signals having different phases; and an image generator configured to generate image data about the subject, the image data including depth information that is calculated based on a difference between the phases of the at least two optical modulation signals.

The oscillator may include: a resonator configured to resonate via an energy exchange with the optical shutter to generate the driving voltage; an energy supplementer configured to supply, to the resonator, replacement energy corresponding to an amount of energy lost during the energy exchange between the resonator and the optical shutter; and a distortion compensator configured to compensate for a distortion of the energy supplied by the energy supplementer to the resonator.

The distortion compensator may be connected to the energy supplementer so that the distortion compensator may be configured to prevent the energy supplementer from blocking the driving voltage from swinging to a negative value.

The optical shutter may include a first end and a second end, and the resonator may include: an inductor comprising a first end electrically connected to the first end of the optical shutter and a second end; and a capacitor comprising a first end that may be electrically connected to the second end of the inductor, and a second end connected to the bias voltage and the second end of the optical shutter.

The energy supplementer may be further configured to supply energy to the capacitor via the inductor when energy is exchanged between the capacitor and the optical shutter.

The energy supplementer may include: a first switching element comprising a first end connected to a power supply terminal and a second end connected to the first end of the inductor, the first switching element being configured to be switched by a voltage on the second end of the inductor; a second switching element comprising a first end connected to the power supply terminal and a second end connected to the second end of the inductor, the second switching element being configured to be switched by a voltage on the first end of the inductor; a third switching element comprising a first end connected to the first end of the inductor and a second end, the third switching element being configured to be switched by the voltage on the second end of the inductor; and a fourth switching element comprising a first end connected to the second end of the inductor and a second end connected to the second end of the third switching element, the fourth switching element being configured to be switched by the voltage on the first end of the inductor.

The first and fourth switching elements are configured to, when energy is moved from the capacitor to the optical shutter via the inductor, be turned on to supply energy to the capacitor, and the second and third switching elements are configured to, when energy is moved from the optical shutter to the capacitor via the inductor, be turned on to supply energy to the capacitor.

The first and second switching elements may include respective p-type metal-oxide-semiconductor (PMOS) transistors, and the third and fourth switching elements may include respective n-type metal-oxide-semiconductor (NMOS) transistors.

The distortion compensator may include at least one resistor connected between the second ends of the third and fourth switching elements and a ground terminal, and the distortion compensator may be further configured to balance a mismatch between driving capabilities of the third and fourth switching elements.

The distortion compensator may include a first compensator and a second compensator. The third switching element may be connected to the first end of the inductor via the first compensator of the distortion compensator, and the fourth switching element may be connected to the second end of the inductor via the second compensator of the distortion compensator.

The first compensator may include a first diode configured to supply a current from the first end of the inductor to the third switching element, and the second compensator may include a second diode configured to supply a current from the second end of the inductor to the fourth switching element.

The oscillator further may include a burst mode driver configured to output a burst signal indicating that the 3D image sensor module operating in a burst mode, and the energy supplementer may be further configured to, in response to the burst signal, interrupt a supply of energy to the resonator.

The 3D image sensor may further include a first controller configured to detect a driving voltage supplied from the oscillator to the optical shutter and to generate a control signal, and the oscillator may be further configured to control a supply of energy to the resonator based on the control signal.

The 3D image sensor module may further include: a temperature sensor configured to sense a temperature of the 3D image sensor module and to generate temperature information based on the sensed temperature; and a controller configured to generate a control signal based on the temperature information. The oscillator may be further configured to control a supply of energy to the resonator based on the control signal.

The 3D image sensor module may further include: a memory configured to store feature information corresponding to operational features of the 3D image sensor module; and a controller configured to generate a control signal, based on the feature information. The oscillator may be further configured to control a supply of energy to the resonator based on the control signal.

The optical shutter may include: a first electrode to which the driving voltage is to be supplied; a second electrode to which the driving voltage is to be supplied; a first semiconductor layer disposed between the first and second electrodes; a second semiconductor layer disposed between the first and second electrodes; and a multiple quantum well disposed between the first and second semiconductor layers. The first electrode, the first semiconductor layer, the multiple quantum well, the second semiconductor layer, and the second electrode may be layered in order.

The optical shutter may be further configured to modulate the reflective light into four optical modulation signals having phases of 0 degrees, 90 degrees, 180 degrees, and 270 degrees, respectively.

The image generator may include: an image sensor configured to sense each of the at least two optical modulation signals, to generate an electrical signal corresponding to the sensed optical modulation signal, and output the electrical signal in units of frames; and an image processor configured to calculate the depth information from a difference between phases of respective frames of the at least two optical modulation signals.

The 3D image sensor module may further include a frequency divider configured to divide the oscillation frequency received from the oscillator to generate a clock signal, and the image generator may be further configured to generate the image data in synchronization with the clock signal.

The 3D image sensor module may further include: a light source configured to emit incident light beams to the subject; a light source driver configured to drive the light source so that the incident light beams have different phases; a lens configured to focus the reflective light; and a filter configured to filter the reflective light focused by the lens using a same wavelength band as a bandwidth of the incident light beams and to supply a result of the filtering to the optical shutter.

The 3D image sensor module of claim 1 may further include a plurality of optical shutters.

The light source may be further configured to generate the incident light beams sequentially, and the light source driver may be further configured to drive the light source so that the sequential incident light beams have different phases.

The light source may be further configured to generate the incident light beams substantially simultaneously.

According to an aspect of one or more exemplary embodiments, there is provided a 3D image sensor module including: an optical shutter configured to vary transmittance of reflective light reflected from a subject according to a driving voltage of a sine wave biased with a bias voltage, and to modulate the reflective light into at least two optical modulation signals having different phases; an oscillator comprising a differential LC voltage controlled oscillator (VCO), the differential LC VCO comprising a first end connected to a power supply terminal, and the oscillator being configured to output a distortion-compensated oscillation frequency as the driving voltage of the sine wave biased with the bias voltage; and an image sensor configured to output at least two electrical signals corresponding to the at least two optical modulation signals in units of frames.

The optical shutter may include a first end and a second end. The differential LC VCO may include: an inductor comprising a first end electrically connected to the first end of the optical shutter, and a second end connected to the bias voltage; a capacitor comprising a first end electrically connected to the second end of the inductor, and a second end connected to the bias voltage and the second end of the optical shutter; a first p-type metal-oxide-semiconductor (PMOS) transistor comprising a first end connected to a power supply terminal and a second end connected to the first end of the inductor, the first PMOS transistor being gated by a voltage on the second end of the inductor; a second PMOS transistor comprising a first end connected to the power supply terminal and a second end connected to the second end of the inductor, the second PMOS transistor being gated by a voltage on the first end of the inductor; a first n-type metal-oxide-semiconductor (NMOS) transistor comprising a first end connected to the first end of the inductor and a second end, the first NMOS transistor being gated by the voltage on the second end of the inductor; and a second NMOS transistor comprising a first end connected to the second end of the inductor and a second end connected to the second end of the first NMOS transistor, the second NMOS transistor being gated by the voltage on the first end of the inductor.

The 3D image sensor module may further include: a first diode; and a second diode. The first NMOS transistor may be connected to the first end of the inductor via the first diode, and the second NMOS transistor may be connected to the second end of the inductor via the second diode.

The differential LC VCO may further include at least one resistor connected the second end of the first NMOS transistor and the second end of the second NMOS transistor, the at least one resistor being configured to decrease a voltage on the second end of the first NMOS transistor when the driving voltage swings to a negative value and to block a flow of a current from the second end of the first NMOS transistor to the first end of the first NMOS transistor.

The oscillator may further include a third NMOS transistor configured to interrupt a power supply to the resonator in response to a burst signal instructing that an operation of the 3D image sensor module be performed in a burst mode.

The third NMOS transistor may be connected between a current source for supplying a reference current which is a basis for generating a power supply current that is supplied to the power supply terminal and a ground terminal, the third NMOS transistor being gated by the burst signal.

The oscillator may further include: a fourth NMOS transistor connected between the first end of the inductor and a ground terminal, the fourth NMOS transistor being gated by the burst signal; and a fifth NMOS transistor connected between the second end of the inductor and a ground terminal, the fifth NMOS transistor being gated by the burst signal.

The 3D image sensor module may further include a first controller configured to detect a driving voltage supplied from the oscillator to the optical shutter and to generate a control signal, and the oscillator may be further configured to control a supply of energy to the differential LC VCO based on the control signal.

The 3D image sensor module may further include a frequency divider configured to divide the oscillation frequency received from the oscillator to generate a clock signal, and the image sensor may be further configured to output the at least two electrical signals in units of frames in synchronization with the clock signal.

According to an aspect of one or more exemplary embodiments, there is provided an electronic apparatus including a 3D image sensor module.

According to an aspect of one or more exemplary embodiments, there is provided an apparatus configured to measure the subject, the apparatus including a 3D image sensor module.

According to an aspect of one or more exemplary embodiments, there is provided a method of sensing depth information of a subject, the method including: varying a transmittance of reflective light reflected from the subject based on a driving voltage of a sine wave biased with a bias voltage; modulating the reflective light into at least two optical modulation signals having different phases; and calculating depth information based on a difference between the phases of the at least two optical modulation signals.

The method may further include: generating a distortion-compensated oscillation frequency as the driving voltage of the sine wave biased with the bias voltage; generating a clock signal by dividing the oscillation frequency; and calculating the depth information in synchronization with the clock signal.

The method may further include emitting incident light beams having different phases towards the subject, and the reflective light may include the incident light beams reflected by the subject.

The emitting the incident light beams having the different phases may include sequentially emitting the incident light beams having the different phases.

The emitting the incident light beams having the different phases may include substantially simultaneously the incident light beams having the different phases.

The method may further include generating image data about the subject, the image data comprising the depth information.

BRIEF DESCRIPTION OF THE DRAWINGS

These and/or other aspects will become apparent and more readily appreciated from the following description of one or more exemplary embodiments, taken in conjunction with the accompanying drawings in which.

DETAILED DESCRIPTION

Figure 1:
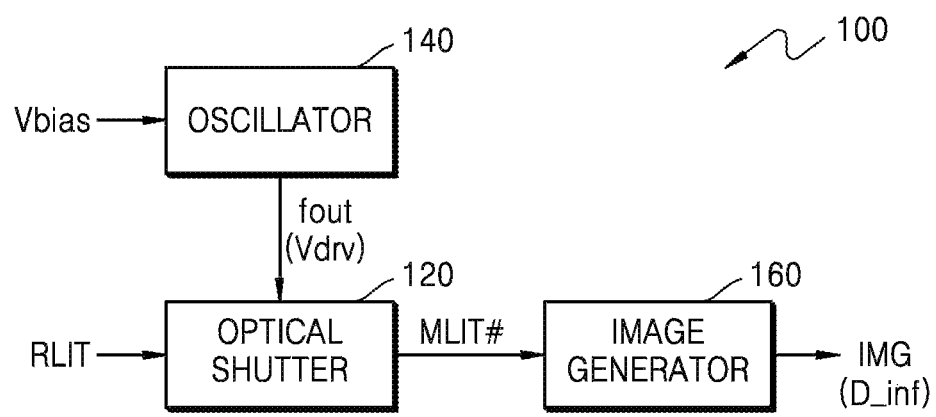
FIG. 1 is a block diagram of a three-dimensional (3D) image sensor module according to an exemplary embodiment.

Reference will now be made in detail to one or more exemplary embodiments with reference to the accompanying drawings, wherein like reference numerals refer to the like elements throughout. One or more exemplary embodiments may have different forms and should not be construed as being limited to the descriptions set forth herein.

FIG. 1 is a block diagram of a three-dimensional (3D) image sensor module 100, i.e., an image sensor, an image sensor unit, or an image sensor chip, according to an exemplary embodiment. Referring to FIG. 1, the 3D image sensor module 100 includes an optical shutter 120, an oscillator 140, and an image generator 160. The 3D image sensor module 100 may be implemented by using a single chip.

The optical shutter 120 varies transmittance of reflective light RLIT reflected from a subject, according to a driving voltage Vdrv, and modulates the reflective light RLIT into at least two optical modulation signals MLIT# having different phases. For example, the optical shutter 120 may modulate the reflective light RLIT into four optical modulation signals MLIT# having phases of 0 degrees, 90 degrees, 180 degrees, and 270 degrees, respectively. The at least two optical modulation signals MLIT# may be simultaneously, substantially simultaneously, or sequentially output from the optical shutter 120.

Figure 2:
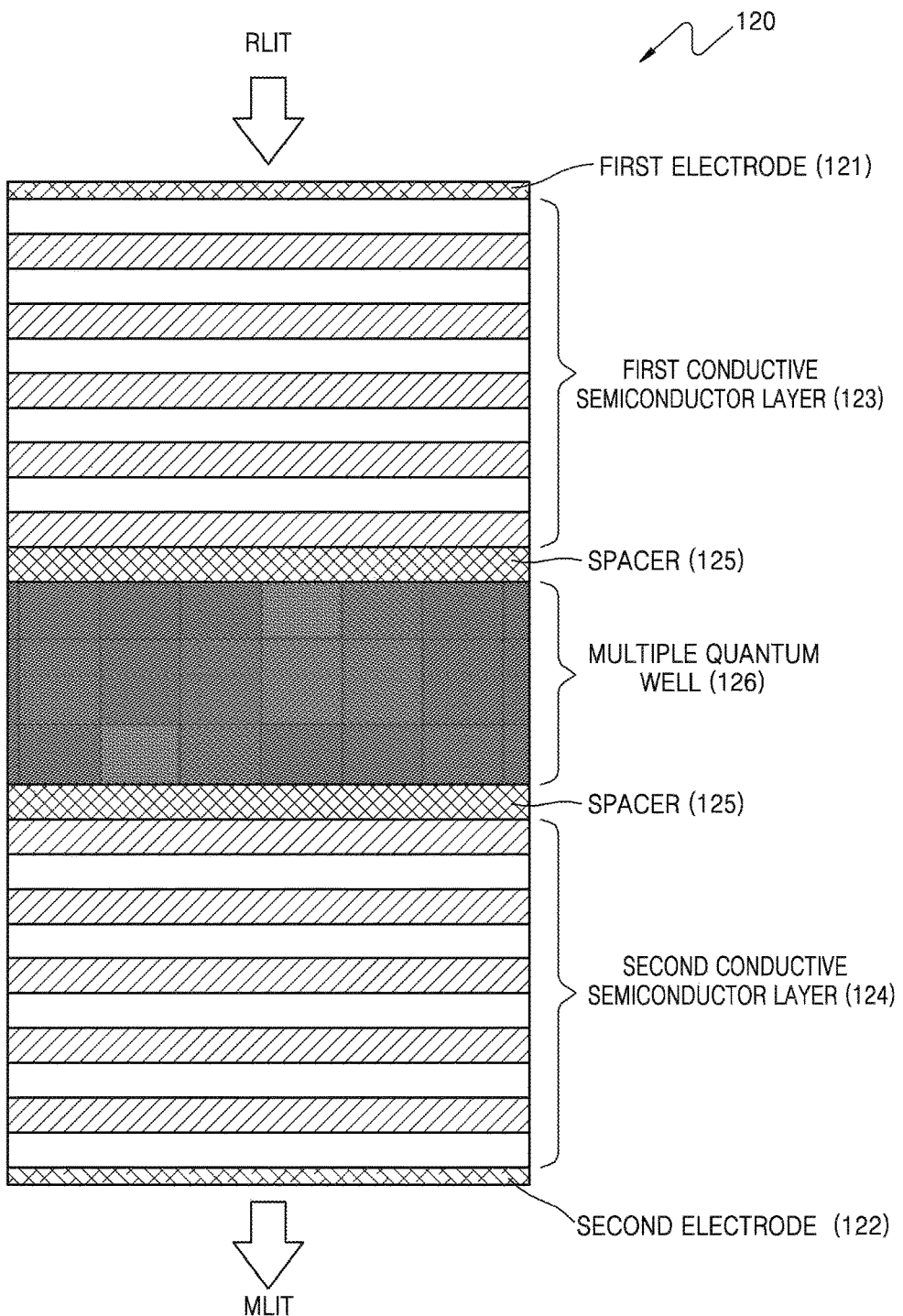
FIG. 2 is a cross-sectional view of an optical shutter included in the 3D image sensor module according to an embodiment.

FIG. 2 is a cross-sectional view of an optical shutter 120 according to an exemplary embodiment, and FIGS. 3 through 6B are diagrams for explaining operational characteristics of the optical shutter of FIG. 2. Referring to FIG. 2, the optical shutter 120 may include a first electrode 121, a second electrode 122, a first conductive semiconductor layer 123, a second conductive semiconductor layer 124, a spacer 125, and a multiple quantum well 126. However, the optical shutter 120 of FIG. 2 is only an example, and the 3D image sensor module 100 may include an optical shutter having a structure that is different from that of the optical shutter 120 of FIG. 2.

A driving voltage Vdry is applied between the first electrode 121 and the second electrode 122. The first electrode 121 may be a p-type electrode, and the second electrode 122 may be an n-type electrode. In this case, the first conductive semiconductor layer 123 may be a p-type distributed Bragg reflector (DBR), and the second conductive semiconductor layer 124 may be an n-type DBR. As a non-limiting example, the first conductive semiconductor layer 123 and the second conductive semiconductor layer 124 may each have a structure in which $Al_{0.31}GaAs$ and $Al_{0.84}GaAs$ are alternately stacked. The spacer 125 is positioned between the first conductive semiconductor layer 123 and the multiple quantum well 126 and between the second conductive semiconductor layer 124 and the multiple quantum well 126. The spacer 125 may be formed of $Al_{0.31}GaAs$. The multiple quantum well 126 may be formed of GaAs or $Al_{0.31}GaAs$.

Figure 3:
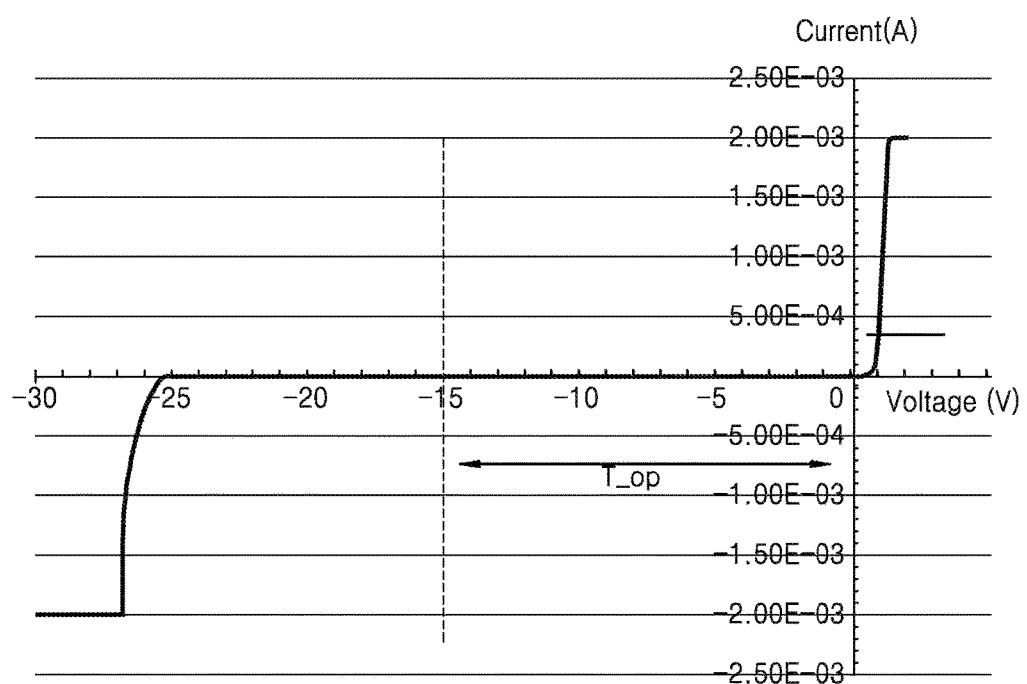
FIGS. 3 through 6B are diagrams for explaining operational characteristics of an optical shutter according to various exemplary embodiments.

The first conductive semiconductor layer 123 and the second conductive semiconductor layer 124 operate as a pair of resonating mirrors, and the multiple quantum well 126 performs electro-absorption, and thus functions as a resonance cavity. A reverse bias voltage (i.e., the driving voltage Vdry of FIG. 1) is applied between the first electrode 121 and the second electrode 122, as illustrated in FIG. 3. FIG. 3 illustrates an example in which, in the optical shutter 120 of FIG. 2, light absorption (electro-absorption) in the multiple quantum well 126 is controlled with a reverse bias voltage having a voltage level belonging to a section T_op of 0 volts to −15 volts.

Figure 4:
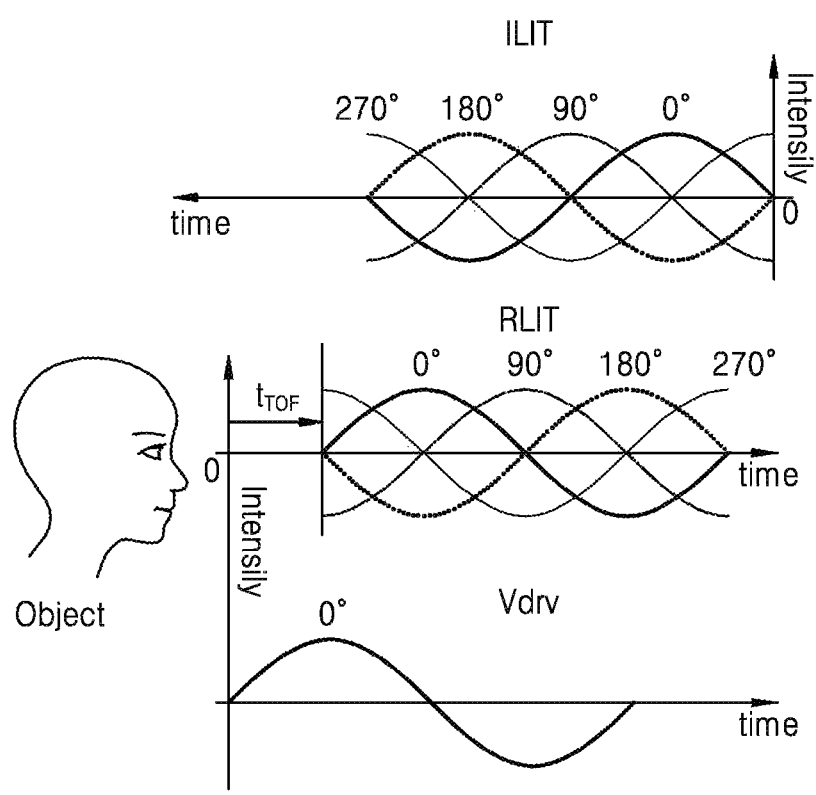

According to a reverse bias voltage having a voltage level between 0 volts and −15 volts, the reflective light RLIT is modulated differently and thus the at least two optical modulation signals MLIT# may be output, as shown in FIG. 4. Referring to FIG. 4, when incident light having a certain wavelength (e.g., near infrared (NIR) 850 nm) is phase-modulated through a light source (e.g., light-emitting diode (LED) or laser diode (LD)) and phase-modulated incident light ILIT is projected onto a subject, reflective light RLIT reflected from the subject, which has the same wavelength as the incident light, is received by the optical shutter 120. The light source may phase-modulate the incident light ILIT by 0 degrees, 90 degrees, 180 degrees, and 270 degrees and project the phase-modulated incident light ILIT onto the subject. In this case, the optical shutter 120 may vary a voltage level of the reverse bias voltage and phase-modulate the reflective light RLIT by 0 degrees, 90 degrees, 180 degrees, and 270 degrees to output the at least two optical modulation signals MLIT#. As described above, the optical shutter 120 may simultaneously or sequentially output the optical modulation signals MLIT# obtained by phase-modulating the reflective light RLIT by 0 degrees, 90 degrees, 180 degrees, and 270 degrees. When the 3D image sensor module 100 includes multiple optical shutters 120 each having the same structure as that of FIG. 2, at least two optical modulation signals MLIT# may be simultaneously output. On the other hand, when the 3D image sensor module 100 includes only one optical shutter 120 having the structure of FIG. 2, at least two optical modulation signals MLIT# may be sequentially output.

Figure 5:
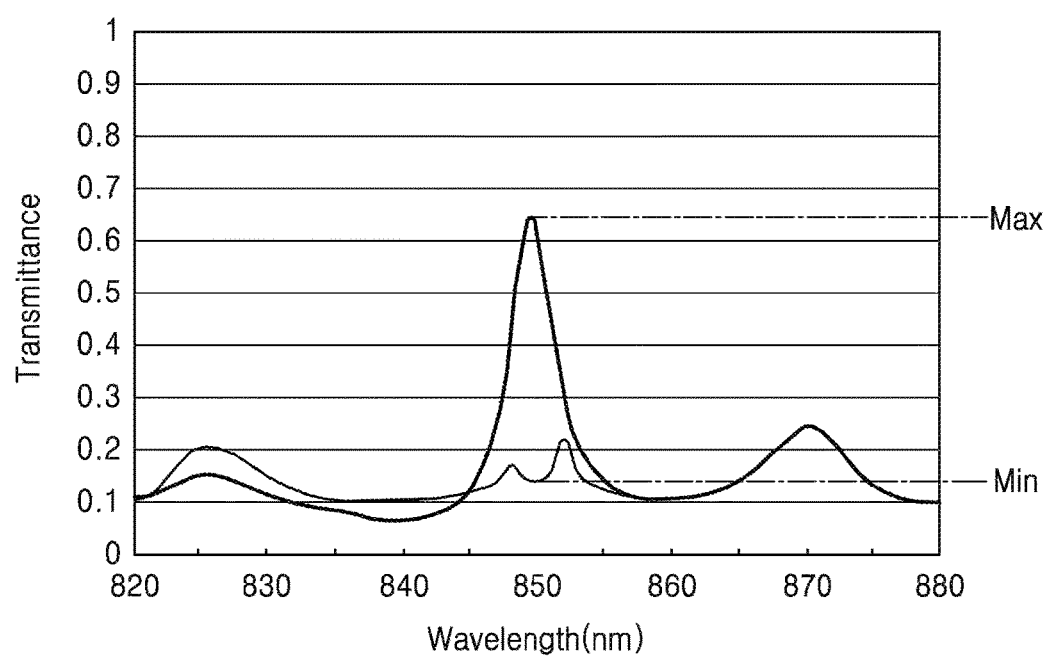

In the optical shutter 120, the transmittance of the reflective light RLIT greatly varies according to a voltage level of the reverse bias voltage at a certain wavelength (e.g., NIR 850 nm), as illustrated in FIG. 5. A voltage level of the reverse bias voltage (driving voltage) may be set so that the optical shutter 120 may transmit the reflective light RLIT based on a transmittance value corresponding to phase modulation from among transmittance values between a maximum value Max and a minimum value Min of FIG. 5. For example, the voltage level of the reverse bias voltage may be set to be a voltage level between 0 volts and −15 volts of FIG. 3, and thus the reflective light RLIT may be phase-modulated by 0 degrees, 90 degrees, 180 degrees, or 270 degrees.

Figure 6A:
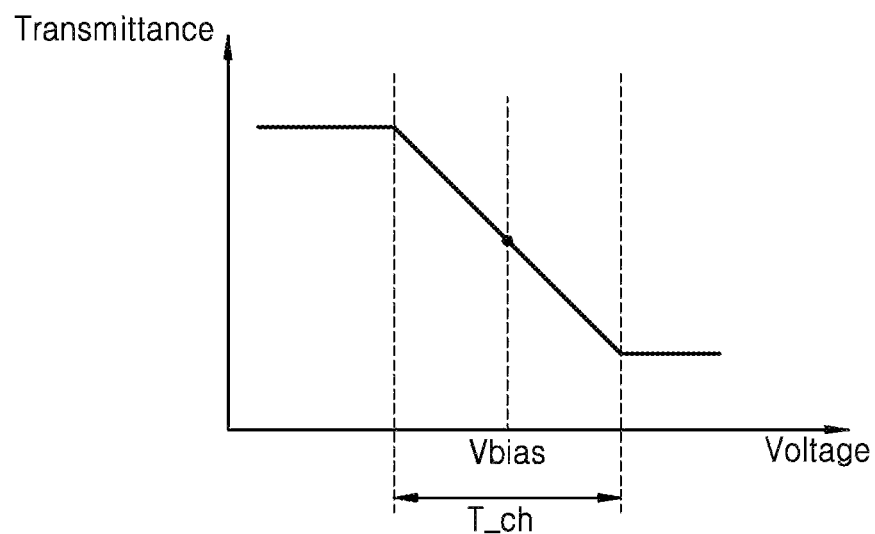
Figure 6B:
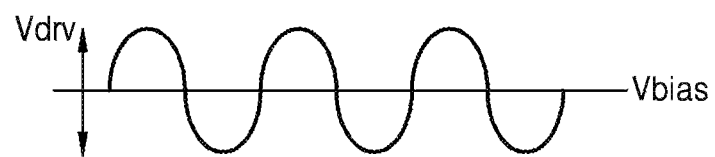

Characteristics of the optical shutter 120 are illustrated in FIG. 6A. Referring to FIG. 6A, only in a section T_ch (between the maximum value Max and the minimum value Min of FIG. 5), is transmittance of the optical shutter 120, with respect to a certain wavelength, changed according to a voltage. Accordingly, the driving voltage Vdry needs to vary within the section T_ch to vary a phase by adjusting transmittance according to the driving voltage Vdrv. Hence, the driving voltage Vdry is generated as a sine wave biased with a bias voltage Vbias, as illustrated in FIG. 6B. The bias voltage Vbias may be a central value of a certain voltage section, i.e., the section T_ch.

Referring back to FIG. 1, the oscillator 140 supplies a distortion-compensated oscillation frequency fout as the driving voltage Vdry to the optical shutter 120. As will be described later, the oscillator 140 may operate as a differential LC voltage controlled oscillator (VCO) to generate an oscillation frequency fout, and the generated oscillation frequency fout functions as the driving voltage Vdry for driving the optical shutter 120. Thus, the oscillation frequency fout may be the same as the driving voltage Vdrv. Unless mentioned otherwise, a signal output by the oscillator 140 will hereinafter be described as the driving voltage Vdrv. As described above, the driving voltage Vdry is generated as a sine wave biased with the bias voltage Vbias.

Figure 7:
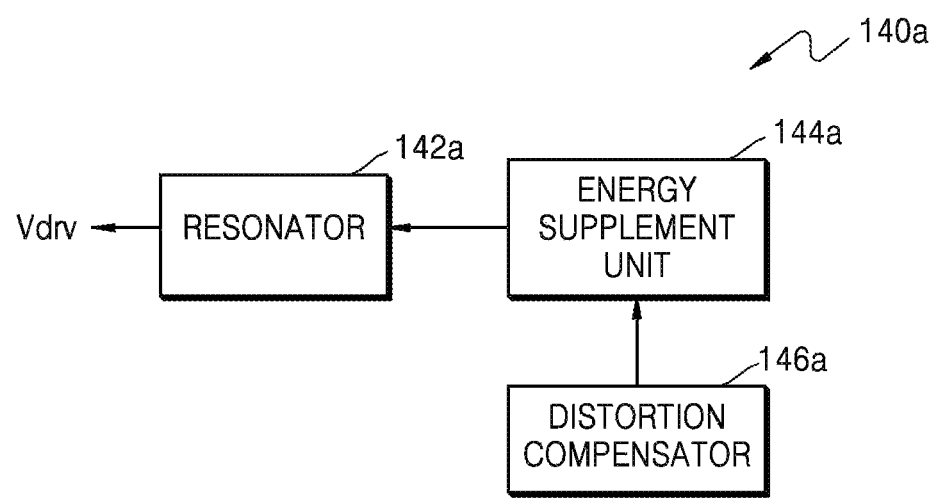
FIG. 7 is a block diagram of an oscillator according to an exemplary embodiment.

FIG. 7 is a block diagram of an oscillator according to an exemplary embodiment. Referring to FIGS. 1 and 7, the oscillator 140a may include a resonator 142a, an energy supplement unit 144a, i.e., an energy supplementer, and a distortion compensator 146a. The resonator 142a may resonate via an energy exchange with the optical shutter 120 to generate a driving voltage Vdrv. For example, the resonator 142a may resonate via a transient energy being released and accumulated between an inductor and a capacitor. The optical shutter 120 may be represented by an equivalent resistor and an equivalent capacitor, and energy exchange between a capacitor of the resonator 142a and a capacitor of the optical shutter 120 may occur while the resonator 142a is resonating. Power consumed when the resonator 142a generates the driving voltage Vdry is relatively low, compared to a linear power amplifier. Thus, the 3D image sensor module 100 which generates the driving voltage Vdry using the oscillator 140a may reduce power consumption. However, this is merely an example, and, according to one or more exemplary embodiments, the resonator 142a may generate the driving voltage using other circuits.

The energy supplement unit 144a may supply, to the resonator 142a, energy corresponding to an amount of energy lost, for example, due to a parasitic resistance of an electrical wire during energy exchange between the resonator 142a and the optical shutter 120. The distortion compensator 146a may compensate for a distortion of the energy supplied to the resonator 142a by the energy supplement unit 144a. For example, the distortion compensator 146a may compensate for the distortion of the energy supplied to the resonator 142a by the energy supplement unit 144a by balancing a mismatch between circuit devices, such as a driving capabilities or the like, that constitute the energy supplement unit 144a.

Figure 8:
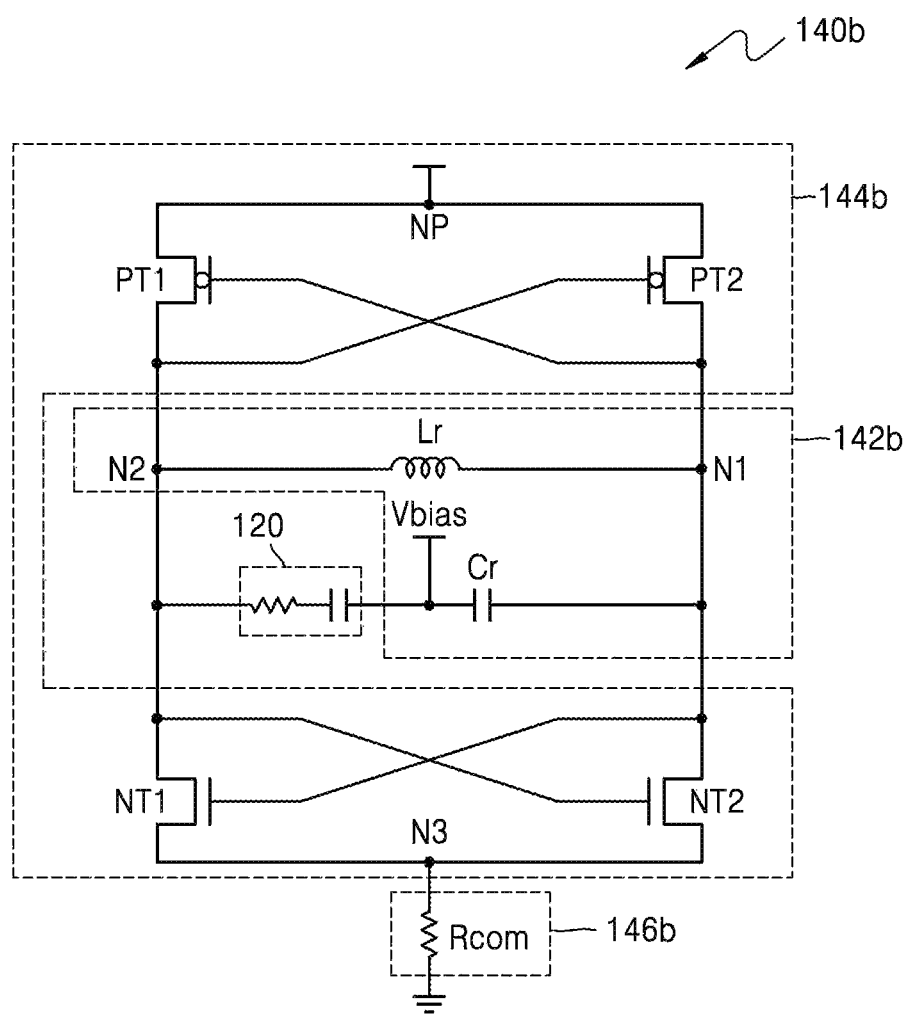
FIG. 8 is a schematic diagram an of oscillator according to an exemplary embodiment.

FIG. 8 is a block diagram of an oscillator according to another exemplary embodiment. Although it appears in FIG. 8 that the oscillator 140b includes the optical shutter 120, this is only for convenience of illustration. Moreover, although the single optical shutter 120 is included in FIG. 8, a plurality of optical shutters 120 may be included. Referring to FIG. 8, the oscillator 140b may include a resonator 142b, an energy supplement unit 144b, and a distortion compensator 146b which may perform similar functions as the resonator 142a, the energy supplement unit 144a, and the distortion compensator 146a of FIG. 7.

The resonator 142b of FIG. 8 may include an inductor Lr of which one end is electrically connected to one end of the optical shutter 120 at a second node N2, and a capacitor Cr of which one end is electrically connected to the other end of the inductor Lr at a first node N1 and the other end to which the bias voltage Vbias is supplied is connected to the other end of the optical shutter 120. As described above, the optical shutter 120 may be represented as an equivalent resistor and an equivalent capacitor.

When energy is moved from the capacitor Cr to the optical shutter 120 via the inductor Lr or energy is moved from the optical shutter 120 to the capacitor Cr via the inductor Lr, the energy supplement unit 144b may supply energy to the capacitor Cr. To this end, the energy supplement unit 144b may include first through fourth switching elements PT1, PT2, NT1, and NT2. Although the first through fourth switching elements PT1, PT2, NT1, and NT2 are transistors in FIG. 8, one or more exemplary embodiments are not limited thereto.

One end of a first PMOS transistor PT1 may be connected to a power supply terminal NP, and the other end thereof may be connected to one end of the inductor Lr, at the second node N2. The first PMOS transistor PT1 may be switched or gated by a voltage on the other end of the inductor Lr, namely, a voltage on the first node N1. One end of a second PMOS transistor PT2 may be connected to the power supply terminal NP, and the other end thereof may be connected to the other end of the inductor Lr, at the first node N1. The second PMOS transistor PT2 may be switched or gated by a voltage on the one end of the inductor Lr, namely, a voltage on the second node N2.

One end of a first NMOS transistor NT1 may be connected to the one end of the inductor Lr, at the second node N2, and the other end of the first NMOS transistor NT1 may be connected to one end of a second NMOS transistor NT2 at a third node N3. The first NMOS transistor NT1 may be switched or gated by the voltage on the other end of the inductor Lr, namely, the voltage on the first node N1. One end of the second NMOS transistor NT2 may be connected to the other end of the inductor Lr at the second node N2, and the other end thereof may be connected to the other end of the first NMOS transistor NT1 at the third node N3. The second NMOS transistor NT2 may be switched or gated by the voltage on the one end of the inductor Lr, namely, the voltage on the second node N2.

As energy accumulated in the capacitor Cr is supplied to the optical shutter 120 via the inductor Lr, a node voltage of the first node N1, which is the voltage on the other end of the inductor Lr, decreases, and, thus, the first PMOS transistor PT1 is turned on. A node voltage of the second node N2, which is the voltage on the one end of the inductor Lr, increases, and, thus, the second NMOS transistor NT2 is turned on. Thus, a current path may be formed from the power supply terminal NP to the first PMOS transistor PT1, to the optical shutter 120, to the capacitor Cr, to the second NMOS transistor NT2, to a ground terminal. On the other hand, as energy is supplied from the optical shutter 120 to the capacitor Cr, the node voltage of the second node N2 decreases, and thus the second PMOS transistor PT2 is turned on. The node voltage of the first node N1 increases, and thus the first NMOS transistor NT1 is turned on. Thus, a current path may be formed from the power supply terminal NP to the second PMOS transistor PT2, to the capacitor Cr, to the optical shutter 120, to the first NMOS transistor NT1, to the ground terminal.

The distortion compensator 146b may be connected between the third node N3 to which the other end of the first NMOS transistor NT1 and the other end of the second NMOS transistor NT2 are connected and the ground terminal, and may include one resistor Rcom in order to compensate for a mismatch between the driving capabilities of the first PMOS transistor PT1 and the second PMOS transistor PT2 and driving capabilities of the first NMOS transistor NT1 and the second NMOS transistor NT2. Under similar conditions, differences in driving capabilities, such that an NMOS transistor generates more current than a PMOS transistor, may exist.

Figure 9:
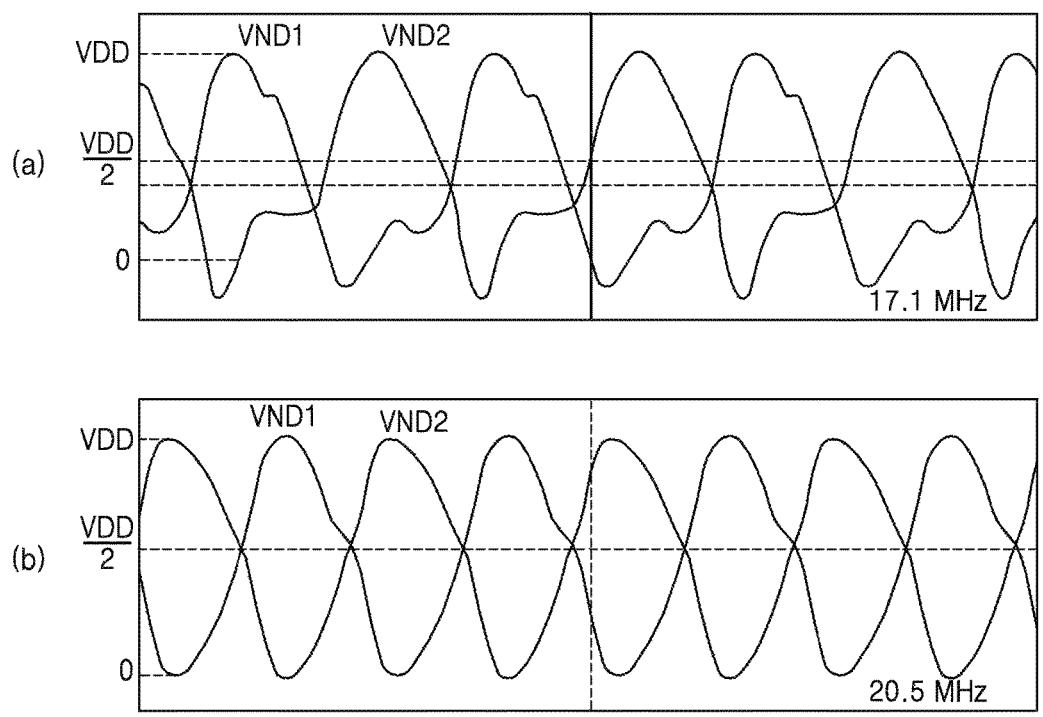
FIG. 9 is a diagram illustrating signal characteristics of an oscillator according to an exemplary embodiment.

Accordingly, as illustrated in (a) of FIG. 9, the first NMOS transistor NT1 or the second NMOS transistor NT2 may generate current faster than the first PMOS transistor PT1 or the second PMOS transistor PT2 generates current, and thus a descending waveform of a node voltage VND1 of the first node N1 or a node voltage VND2 of the second node N2 may be distorted. Since the resistor Rcom of the distortion compensator 146b is connected to the first NMOS transistor NT1 and the second NMOS transistor NT2 at the third node N3, when the node voltage VND1 of the first node N1 or the node voltage VND2 of the second node N2 descends, the resistor Rcom of the distortion compensator 146b may increase a node voltage of the third node N3 to be higher than a ground voltage and thereby reduce the driving capability of the first NMOS transistor NT1 or the second NMOS transistor NT2. Accordingly, as illustrated in (b) of FIG. 9, distortion of the node voltage VND1 or the node voltage VND2 may be prevented. The driving voltage Vdrv is generated to have a voltage level corresponding to a difference between the node voltage VND1 of the first node N1 and the node voltage VND2 of the second node N2. As such, the oscillator 140b may include the resonator 142b having a structure such that relatively low power is required to generate the driving voltage Vdrv, and may supplement the energy lost in the resonator 142b and also compensate for distortion of the node voltage VND1 or the node voltage VND2, thereby reducing power consumption and also generating s more accurate driving voltage Vdrv.

Figure 10:
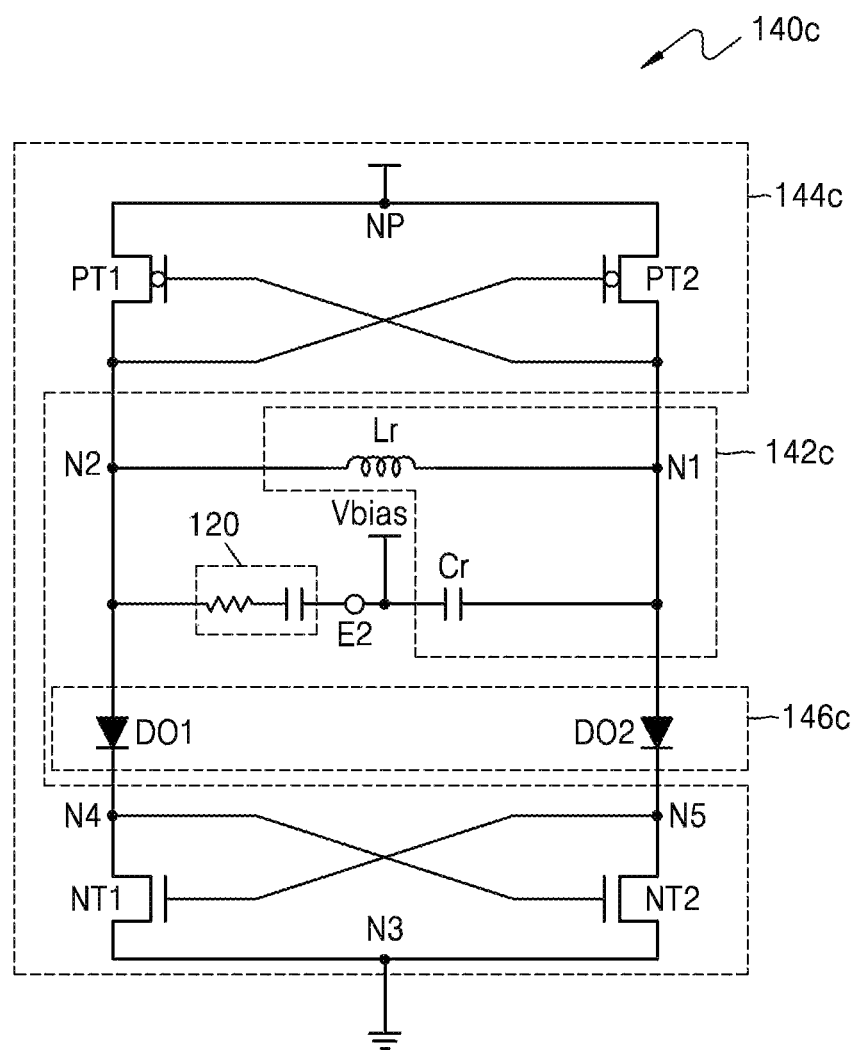
FIG. 10 is a schematic diagram an of oscillator according to an exemplary embodiment.

FIG. 10 is a block diagram of an oscillator according to another exemplary embodiment. Referring to FIG. 10, the oscillator 140c includes a resonator 142c and an energy supplement unit 144c which perform the same functions as those of the resonator 142b and the energy supplement unit 144b of FIG. 8. A distortion compensator 146c of the oscillator 140c of FIG. 10 may include a first compensator and a second compensator. The first compensator may be a first diode DO1, and the second compensator may be a second diode DO2. A first NMOS transistor NT1 of the energy supplement unit 144c may be connected to one end of an inductor Lr via the first diode DO1 at a fourth node N4, and a second NMOS transistor NT2 thereof may be connected to the other end of the inductor Lr via the second diode DO2 at a fifth node N5. The first diode DO1 provides a current from the second node N2, to which the one end of the inductor Lr is connected, to the first NMOS transistor NT1, and the second diode DO2 provides a current from the first node N1, to which the other end of the inductor Lr is connected, to the second NMOS transistor NT2. The first diode DO1 or the second diode DO2 may prevent the distortion illustrated in (a) of FIG. 9, by preventing a current from flowing from the third node N3 to the first node N1 or the second node N2.

Figure 11:
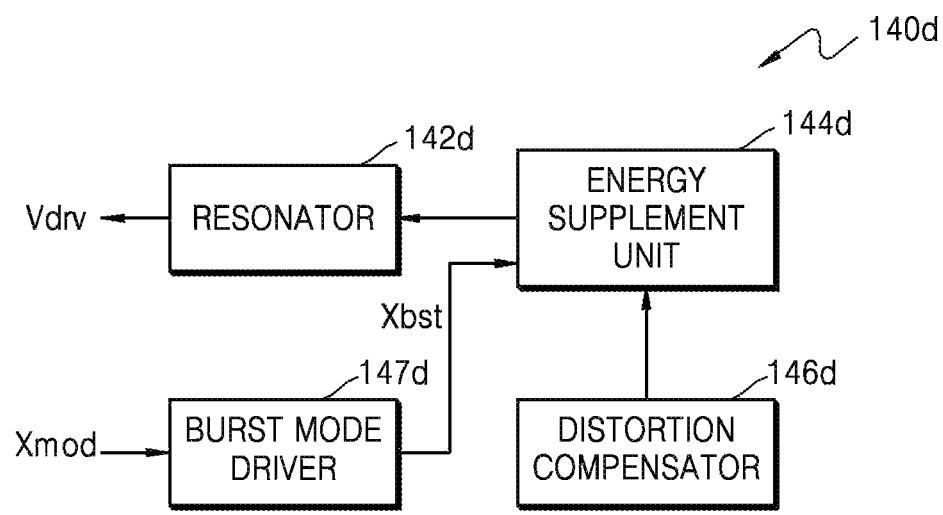
FIG. 11 is a block diagram of an oscillator according to an exemplary embodiment.

FIG. 11 is a block diagram of an oscillator according to another exemplary embodiment. Referring to FIG. 11, the oscillator 140d may include a resonator 142d, an energy supplement unit 144d, and a distortion compensator 146d, similar to the oscillator 140a of FIG. 7. Structures and functions of the resonator 142d, the energy supplement unit 144d, and the distortion compensator 146d may be similar to those described above with reference to FIG. 7. The oscillator 140d of FIG. 11 may further include a burst mode driver 147d. The burst mode driver 147d outputs a burst signal Xbst for instructing that an operation be performed in a burst mode.

The burst mode is a mode in which power that is supplied to the oscillator 140d in order to generate a driving voltage Vdry for one frame is supplied only in a partial period of the frame. The burst mode may be enabled in a case where a partial period of one frame sensed by an image sensor is sufficient to generate a frame, a case where it is necessary to reduce exposure to ambient light, or any of other cases.

Figure 12:
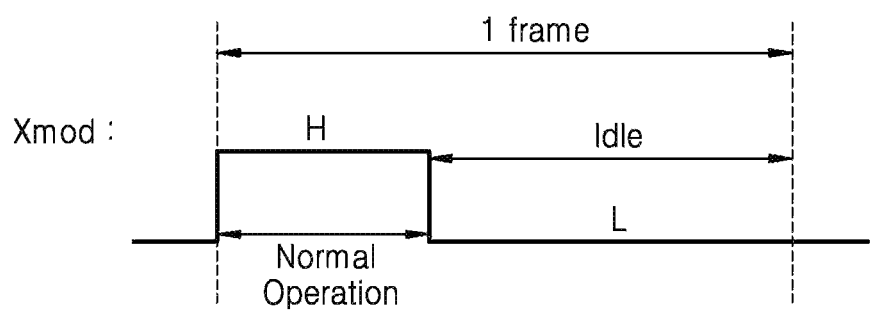
FIG. 12 illustrates a mode signal of an oscillator according to an exemplary embodiment.

The burst mode driver 147d may generate the burst signal Xbst in response to a mode signal Xmod that is supplied from the outside. The mode signal Xmod may be supplied as illustrated in FIG. 12. For example, when the mode signal Xmod is at a logic high (H) level is supplied to the burst mode driver 147d, power is supplied to the oscillator 140d in a normal state, and thus an operation of supplying the driving voltage Vdry to the optical shutter 120 is performed. On the other hand, when the mode signal Xmod is at a logic low (L) level is supplied to the burst mode driver 147d, the supply of power to the oscillator 140d is interrupted, and thus the driving voltage Vdry is not generated. The burst signal Xbst corresponding to the burst mode Xmod may be input to the energy supplement unit 146d. The energy supplement unit 144d may interrupt the supply of power to the oscillator 140d, in response to the burst signal Xbst.

Figure 13:
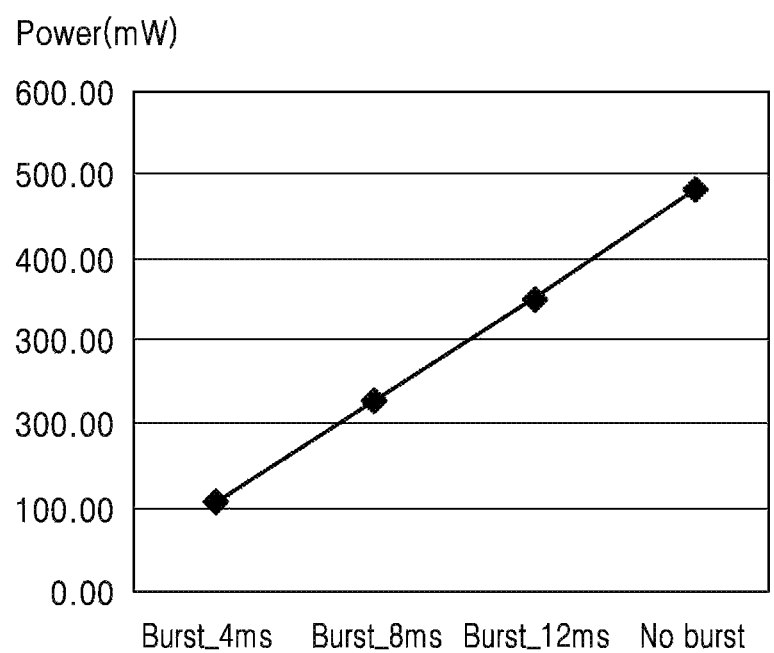
FIG. 13 is a graph showing an effect provided by the 3D image sensor module of FIG. 1.

As such, as the 3D image sensor module 100 includes the burst mode driver 147d, the oscillator 140d operates only in a partial period of a frame, thereby reducing power consumption. As illustrated in FIG. 13, as a normal operation section (indicated by the normal operation of FIG. 12) in a burst mode decreases, power consumption also decreases. Moreover, as the 3D image sensor module 100 includes the burst mode driver 147d, an optical modulation signal may be generated when ambient light or the like is minimal, and, thus, a more accurate image may be acquired.

Figure 14:
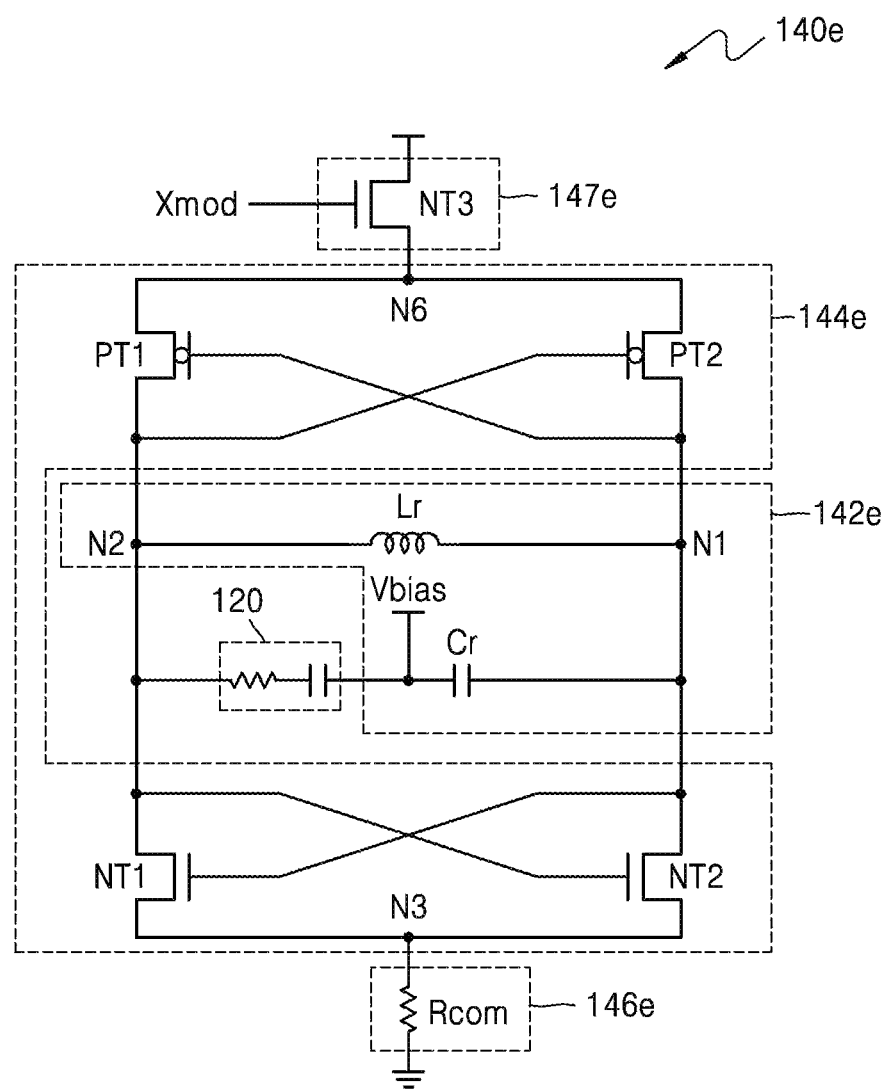
FIGS. 14 through 16 are schematic diagrams of oscillators according to one or more exemplary embodiments.

FIG. 14 is a circuit diagram of an oscillator according to another exemplary embodiment. Referring to FIG. 14, the oscillator 140e may include a resonator 142e, an energy supplement unit 144e, and a distortion compensator 146e similar to the oscillator 140b of FIG. 8, as well as a burst mode driver 147e. Structures and functions of the resonator 142e, the energy supplement unit 144e, and the distortion compensator 146e may be similar to those described above with reference to FIG. 8. The burst mode driver 147e may include a third NMOS transistor NT3 for interrupting the supply of power to the resonator 142e in response to the mode signal Xmod. The third NMOS transistor NT3 may be connected between a power supply terminal and a sixth node N6 to which one end of a first PMOS transistor PT1 and one end of a second PMOS transistor PT2 are connected. For example, when the mode signal Xmod is at a logic low (L) level is supplied, the third NMOS transistor NT3 is turned off and, thus, disconnects the power supply terminal from the sixth node N6, thereby interrupting the supply of power to the energy supplement unit 144e. Accordingly, the energy supplement unit 144e stops supplying energy to the resonator 142e, and the driving voltage Vdry is not generated.

Although as illustrated in FIG. 14 the oscillator 140e includes the resonator 142e, the energy supplement unit 144e, and the distortion compensator 146e having similar structures as those illustrated in FIG. 8, one or more exemplary embodiments are not limited thereto. The oscillator 140e may include structures similar to the resonator 142c, the energy supplement unit 146c, and the distortion compensator 146c of FIG. 10.

Figure 15:
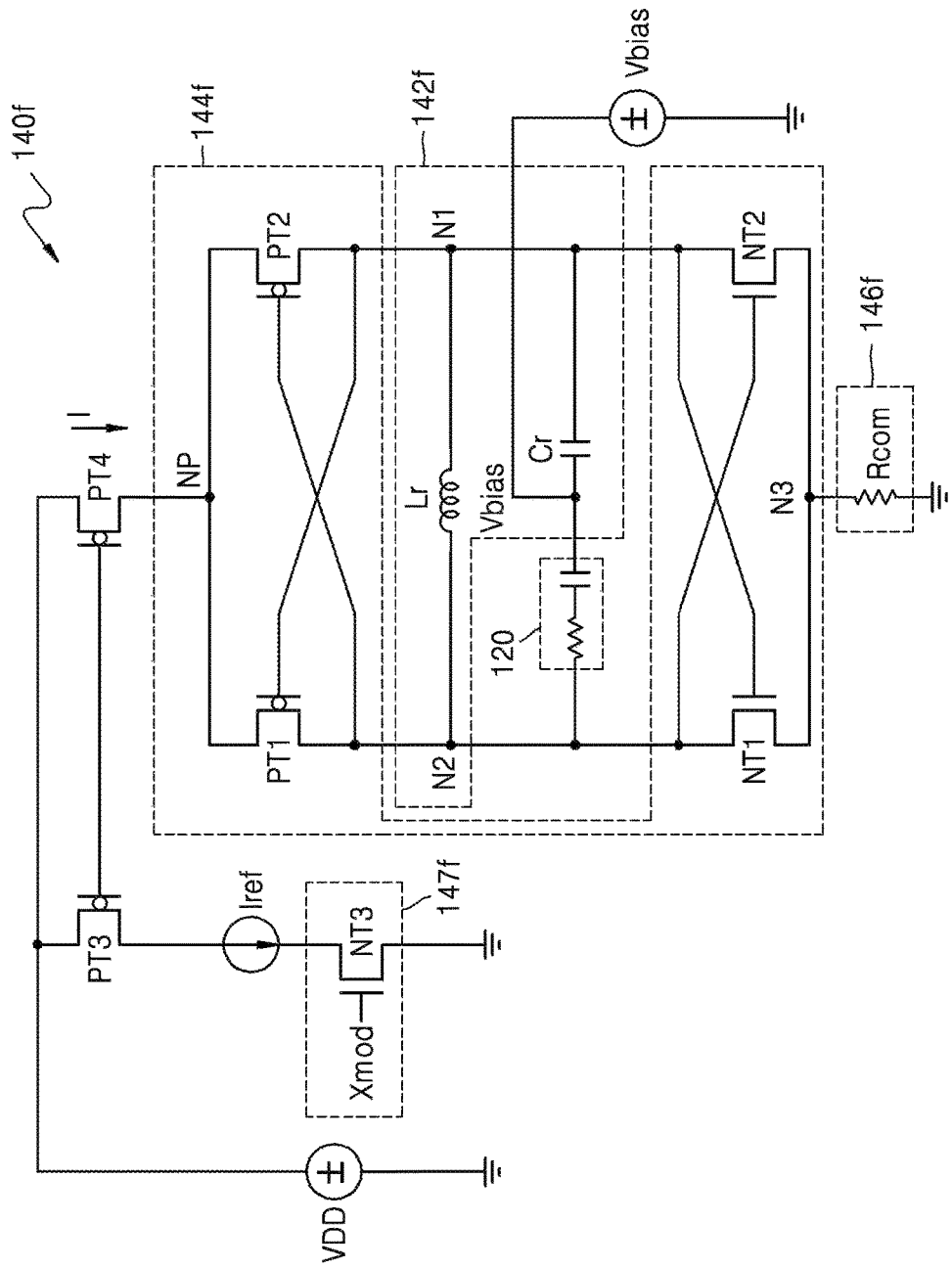

FIG. 15 is a circuit diagram of an oscillator according to another exemplary embodiment. Referring to FIG. 15, the oscillator 140f may include a resonator 142f, an energy supplement unit 144f, a distortion compensator 146f, and a burst mode driver 147f. The oscillator 140f of FIG. 15 may further include a current source Iref generating a reference current to supply a power supply current I to the power supply terminal NP, amplifiers PT3 and PT4 amplifying the reference current generated by the current source Iref by N times, and a voltage source VDD supplying a voltage to the current source Iref. Since the amplifier PT4, that is, a fourth PMOS transistor PT4, has a current driving capability that is N times greater than that of the amplifier PT3, that is, a third PMOS transistor PT3, the fourth PMOS transistor PT4 may amplify the reference current by N times and thus supply a result of the amplification as the power supply current I to the power supply terminal NP. The burst mode driver 147f may be positioned between the current source Iref and a ground terminal. The burst mode driver 147f includes a third NMOS transistor NT3 that is positioned between the current source Iref and the ground terminal and is gated according to the mode signal Xmod, thus controlling the reference current. The third NMOS transistor NT3 controls a section in which the driving voltage Vdry is generated, in response to the mode signal Xmod that is activated only in a certain period of a frame, and, therefore, power consumption may be decreased and an optical modulation signal having an accurate value may be generated.

Although as illustrated in the exemplary embodiment of FIG. 15 that an oscillator includes a resonator, an energy supplement unit, and a distortion compensator having similar structures as those described above with reference to FIG. 8, this is merely an example, and the oscillator may include a resonator, an energy supplement unit, and a distortion compensator having structured, as a non-limiting example, similar to those described above with reference to FIG. 10.

Figure 16:
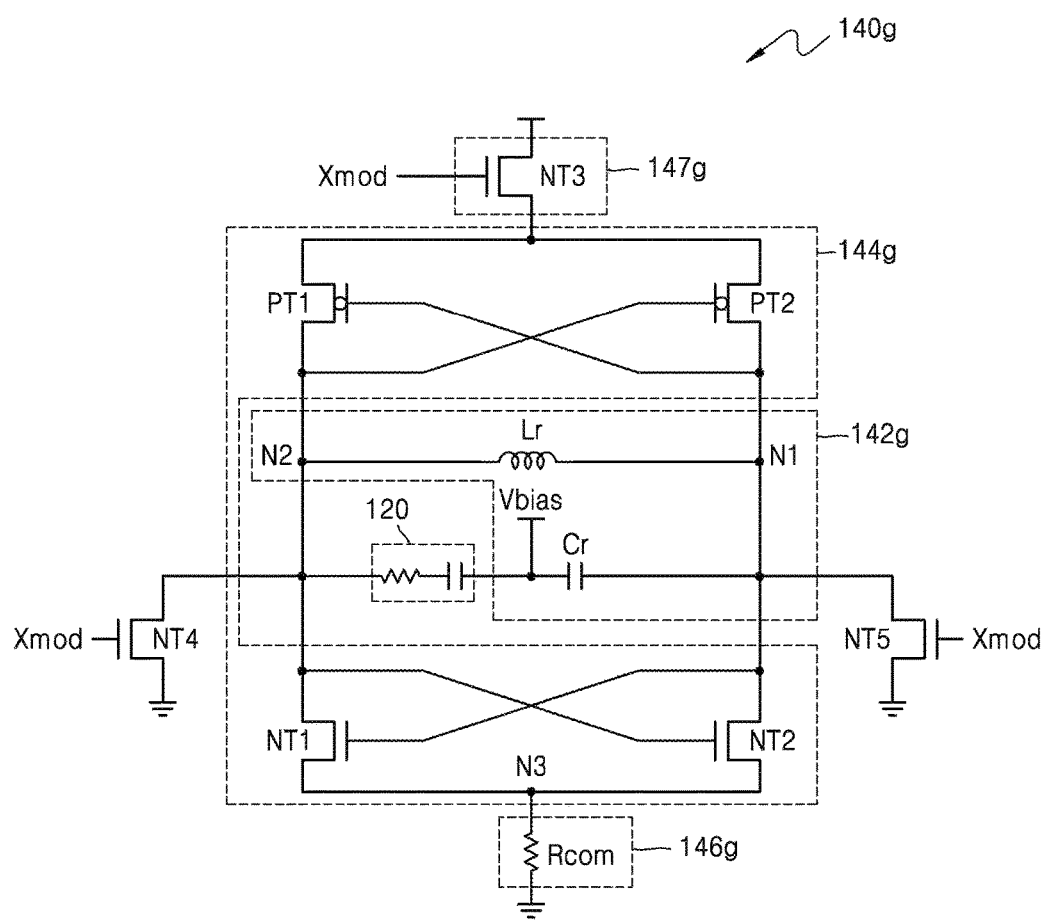

FIG. 16 is a block diagram of an oscillator according to another exemplary embodiment. Referring to FIG. 16, the oscillator 140g may include a resonator 142g, an energy supplement unit 144g, a distortion compensator 146g, and a burst mode driver 147g. The oscillator 140g of FIG. 16 may further include a fourth NMOS transistor NT4 and a fifth NMOS transistor NT5 that are gated by the mode signal Xmod. When a power supply to the oscillator 140g is cut off, the fourth NMOS transistor NT4 and the fifth NMOS transistor NT5 may quickly descend the voltage levels of the first node N1 and the second node N2 to thereby improve signal characteristics. For example, the fourth NMOS transistor NT4 may be connected between the second node N2 and the ground terminal and, thus, may quickly decrease a voltage of the second node N2 to a ground voltage level when receiving a mode signal Xmod at a logic low level. Similarly, the fifth NMOS transistor NT5 may be connected between the first node N1 and the ground terminal and, thus, may quickly decrease a voltage of the first node N1 to the ground voltage level when receiving a mode signal Xmod at a logic high level.

As described above, an oscillator may include a resonator having a structure in which relatively low power is required to generate the driving voltage Vdrv, and may supplement the energy lost in the resonator and also compensate for distortion, thereby reducing power consumption and also generating an accurate driving voltage Vdrv. Accordingly, the optical shutter 120 may perform accurate modulation, and the image generator 160 may generate an accurate image.

Referring back to FIG. 1, the image generator 160 performs image processing on the at least two optical modulation signals MLIT# that are output by the optical shutter 120. The image generator 160 generates image data IMG for a subject, which includes depth information D_inf that is calculated based on a difference between the phases of the at least two optical modulation signals MLIT#. For example, after the image generator 160 processes the four optical modulation signals MLIT# phase-modulated to have phases of 0 degrees, 90 degrees, 180 degrees, and 270 degrees into four frames as shown in FIG. 4, the image generator 160 calculates the four frames according to a depth image generation algorithm to thereby generate one frame (or image) including the depth information D_inf. The image generator 160 may include an image sensor and an image processor described later.

Figure 17:
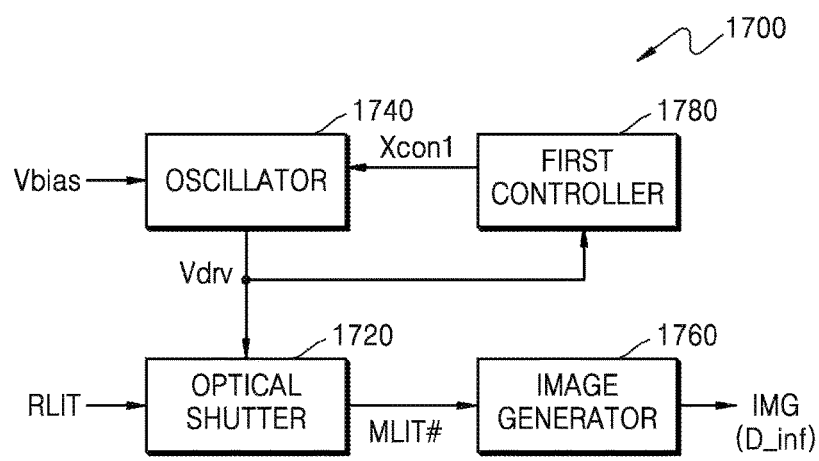
FIGS. 17 through 20 are block diagrams of 3D image sensor modules according to various exemplary embodiments.

FIG. 17 is a block diagram of a 3D image sensor module 1700 according to another exemplary embodiment. Referring to FIG. 17, the 3D image sensor module 1700 may include an optical shutter 1720, an oscillator 1740, an image generator 1760, and a first controller 1780. The optical shutter 1720, the oscillator 1740, and the image generator 1760 may be implemented similar to the above description of various exemplary embodiments. The first controller 1780 may detect the driving voltage Vdry that is supplied from the oscillator 1740 to the optical shutter 1720, to thereby generate a first control signal Xcon1. For example, when the voltage level of the driving voltage Vdry is changed from a preset voltage level, the first controller 1780 may generate the first control signal Xcon1. The first control signal Xcon1 is input to the oscillator 1740, and the oscillator 1740 may control energy supply to a resonator included therein (e.g., the resonator 142a of FIG. 7) in response to the first control signal Xcon1. For example, when the voltage level of the driving voltage Vdry is decreased, the oscillator 1740 may increase energy supply to the resonator in response to the first control signal Xcon1. Thus, the 3D image sensor module 1700 of FIG. 17 may reduce power consumption and also generate a more accurate optical modulation signal MLIT# and more accurate image data IMG.

Figure 18:
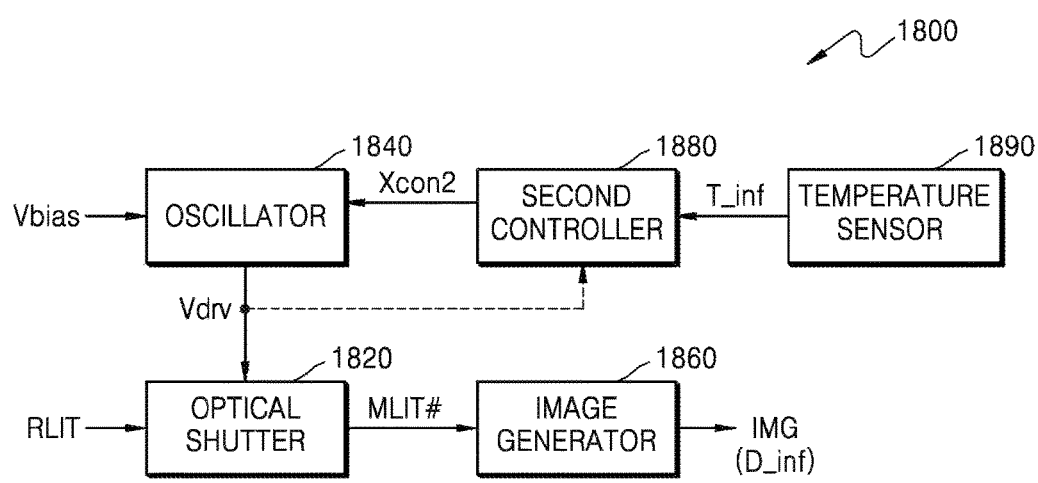

FIG. 18 is a block diagram of a 3D image sensor module 1800 according to another exemplary embodiment. Referring to FIG. 18, the 3D image sensor module 1800 may include an optical shutter 1820, an oscillator 1840, an image generator 1860, a second controller 1880, and a temperature sensor 1890. The optical shutter 1820, the oscillator 1840, and the image generator 1860 may be implemented similar to the above descriptions of various exemplary embodiments. The second controller 1880 may generate a second control signal Xcon2, based on temperature information T_inf received from the temperature sensor 1890. For example, when the value of the temperature information T_inf is changed from a reference value, the second controller 1880 may generate the second control signal Xcon2. The temperature sensor 1890 may sense a temperature of the 3D image sensor module 1800 or a temperature of an electronic apparatus including the 3D image sensor module 1800 to generate a digital value of the temperature information T_inf.

The second control signal Xcon2 is input to the oscillator 1840, and the oscillator 1840 may control energy supply to a resonator included therein (e.g., the resonator 142a of FIG. 7) in response to the second control signal Xcon2. For example, when the value of the temperature information T_inf is lower than the reference value, the oscillator 1840 may decrease energy supplied to the resonator in response to the second control signal Xcon2. However, when the value of the temperature information T_inf is lower than the reference value, the oscillator 1840 may increase the energy supplied to the resonator in response to the second control signal Xcon2, according to the implementation of the 3D image sensor module 1800 or operational characteristics of the 3D image sensor module 1800. The second controller 1880 may detect the driving voltage Vdry that is supplied from the oscillator 1840 to the optical shutter 1820, to thereby additionally perform the above-description operation of the first controller 1780. The second controller 1880 may generate the second control signal Xcon2 in consideration of a relationship between the detected driving voltage Vdry and the temperature information T_inf. As such, the 3D image sensor module 1800 of FIG. 18 may reduce power consumption and also generate a more accurate optical modulation signal MLIT# and more accurate image data IMG.

Figure 19:
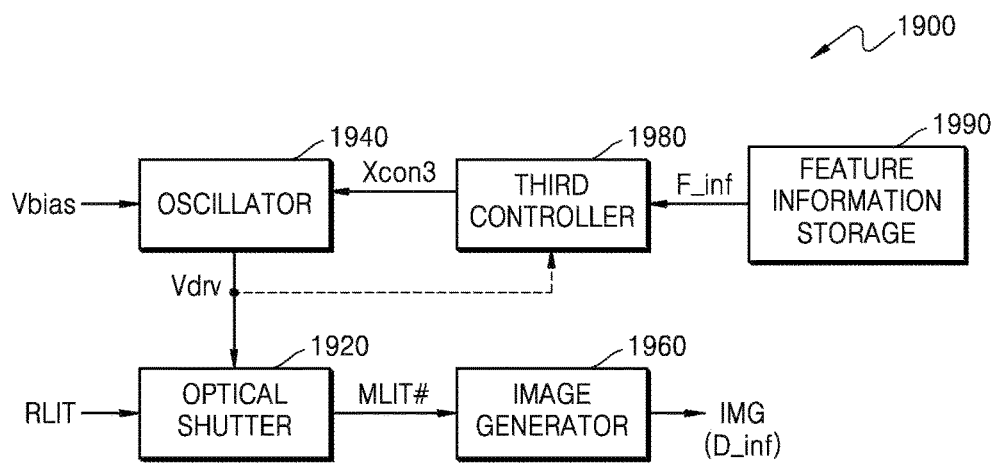

FIG. 19 is a block diagram of a 3D image sensor module 1900 according to another exemplary embodiment. Referring to FIG. 19, the 3D image sensor module 1900 may include an optical shutter 1920, an oscillator 1940, an image generator 1960, a third controller 1980, and a feature information storage 1990, i.e., a storage, a memory, or a storage unit. The optical shutter 1920, the oscillator 1940, and the image generator 1960 may be implemented similar to the above descriptions of various exemplary embodiments. The third controller 1980 may generate a third control signal Xcon3, based on feature information F_inf stored in the feature information storage 1990. The feature information F_inf stored in the feature information storage 1990 includes information about the features of the 3D image sensor module 1900 or the features of an electronic apparatus including the 3D image sensor module 1900. For example, a plurality of 3D image sensor modules 1900 with similar specifications may have different operational features. For example, one 3D image sensor modules may generate a more accurate optical modulation signal MLIT# or more accurate image data IMG when a driving voltage Vdry thereof has a first value, and another 3D image sensor module may generate a more accurate optical modulation signal MLIT# or more accurate image data IMG when a driving voltage Vdry thereof has a second value. The feature information F_inf corresponding to the operational features tailored to an individual 3D image sensor module may be stored, and the third control signal Xcon3 may be generated based on the feature information F_inf so that the 3D image sensor module 1900 uses optimal operational circumstance, settings, controls, or characteristics.

The third control signal Xcon3 is input to the oscillator 1940, and the oscillator 1940 may control energy supply to a resonator included therein (e.g., the resonator 142a of FIG. 7) in response to the third control signal Xcon3. The third controller 1980 may detect the driving voltage Vdry that is supplied from the oscillator 1940 to the optical shutter 1920, to additionally perform the above-description operation of the first controller 1780. The third controller 1980 may generate the third control signal Xcon3 in consideration of a relationship between the detected driving voltage Vdry and the feature information F_inf. As such, the 3D image sensor module 1900 of FIG. 19 may reduce power consumption and generate a more accurate optical modulation signal MLIT# and more accurate image data IMG. The 3D image sensor module 1900 according to one or more exemplary embodiment may include at least two selected from the first controller 1780, the second controller 1880, and the third controller 1980 of FIGS. 17-19.

Figure 20:
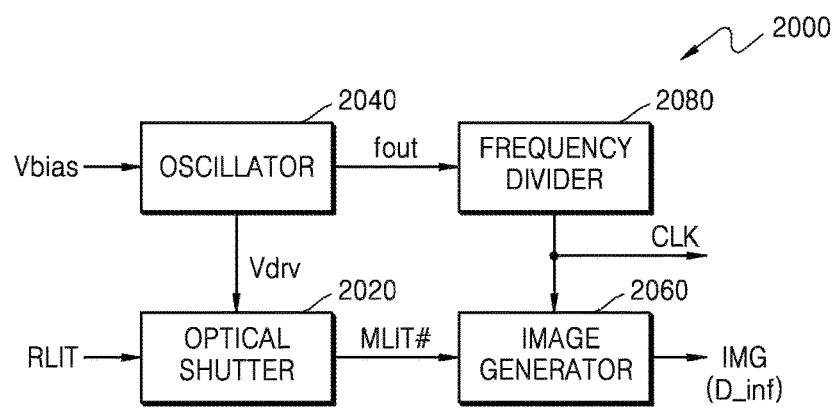

FIG. 20 is a block diagram of a 3D image sensor module 2000 according to another exemplary embodiment. Referring to FIG. 20, the 3D image sensor module 2000 may include an optical shutter 2020, an oscillator 2040, an image generator 2060, and a frequency divider 2080. The optical shutter 2020, the oscillator 2040, and the image generator 2060 may be implemented as described above in relation to the various exemplary embodiments. The frequency divider 2080 may divide an oscillation frequency fout received from the oscillator 2040 to generate a clock signal CLK. The frequency divider 2080 may perform the frequency division by including a Delay-Lock Loop (DLL) or a Phase-Lock Loop (PLL). As described above, the oscillator 2040 generates a distortion-compensated oscillation frequency fout, which is used as a driving voltage Vdry of the optical shutter 2020. The oscillation frequency fout output by the oscillator 2040 may be divided by the frequency divider 2080 and, thus, may be generated as the clock signal CLK that is used in the 3D image sensor module 2000. For example, the image generator 2060 may generate image data IMG in synchronization with the clock signal CLK.

Figure 21:
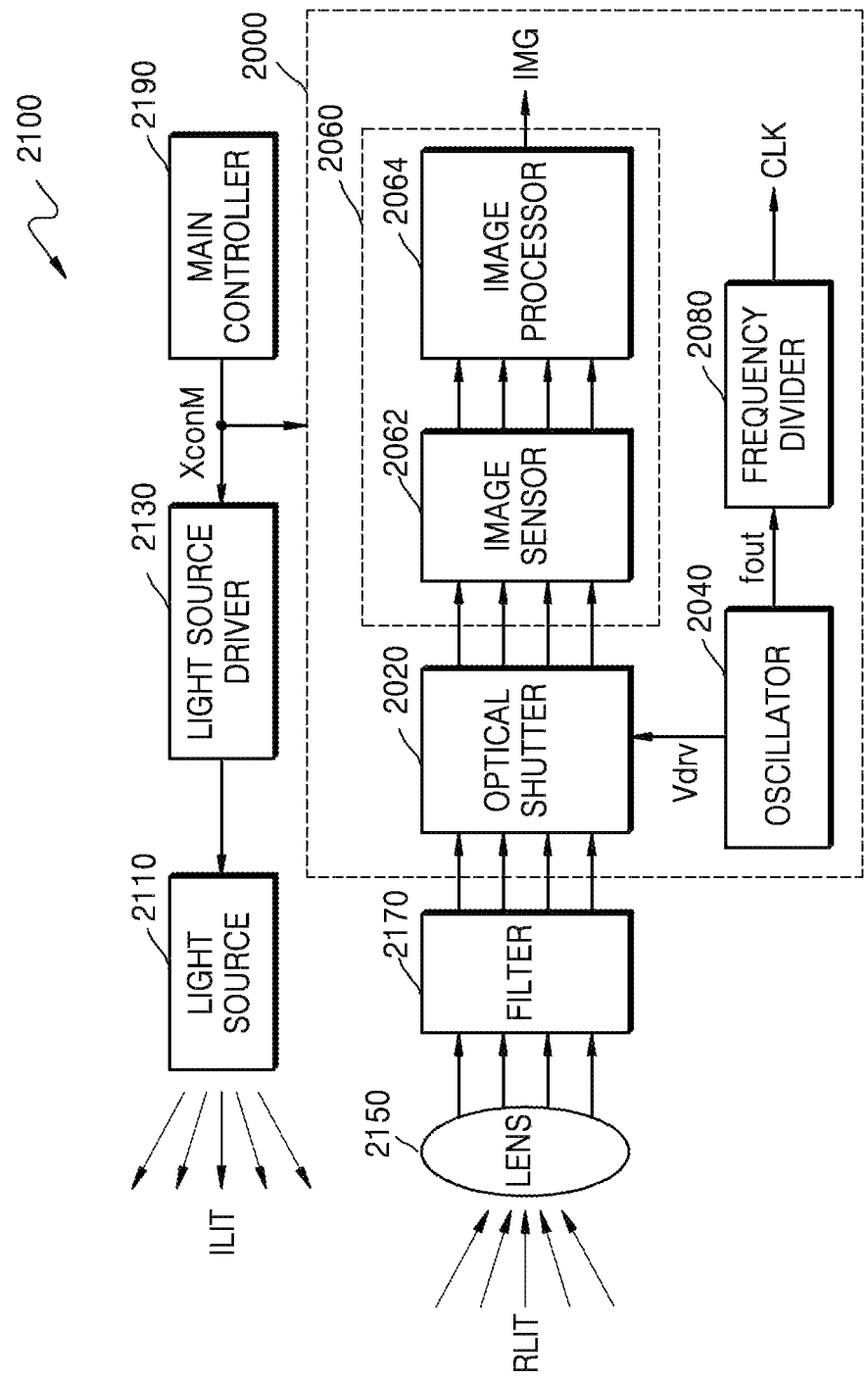
FIGS. 21 through 23 are block diagrams of an electronic apparatuses according to various embodiments.

FIG. 21 illustrates an electronic apparatus including a 3D image sensor module according to an exemplary embodiment. Referring to FIG. 21, the electronic apparatus 2100 may include a light source 2110 for generating light having a predetermined wavelength, a light source driver 2130 for driving the light source 2110, the 3D image sensor module 2000, and a main controller 2190 for generating a main control signal XconM controlling an operation of the light source driver 2130 and an operation of the 3D image sensor module 2000. The electronic apparatus 2100 may further include a lens 2150 for focusing reflective light RLIT on an area of the optical shutter 2120 and a filter 2170 for transmitting only light having a predetermined wavelength and removing background light or miscellaneous light. Although not illustrated in FIG. 21, a second lens for focusing an optical modulated signal on an area of an image sensor 2062 included in the image generator 2060 may be further disposed between the optical shutter 2020 and the image generator 2060.

For example, the light source 2110 may be a light-emitting diode (LED) or a laser diode (LD) that may emit light having a near-infrared ray (NIR) wavelength of about 850 nm, which is not visible to the human eye, but a wavelength and a type of light source are not limited to this exemplary embodiment. The light source driver 2130 may drive the light source 2110 by using, for example, an amplitude modulation or phase modulation method, according to the main control signal XconM received from the main controller 2190. Depending on a driving signal of the light source driver 2130, incident light ILIT that radiates from the light source 2110 to a subject may have a form of a periodic continuous function having a predetermined period. For example, the incident light ILIT may be generated as illustrated in FIG. 4.

The 3D image sensor module 2000 including the optical shutter 2020, the oscillator 2040, the image generator 2060, and the frequency divider 2080 may operate as described above. The image generator 2060 may include the image sensor 2062 and an image processor 2064 and may perform the above-described generation of the image data IMG. However, the image generator 2060 of the 3D image sensor module 2000 may include only the image sensor 2062, and the image processor 2064 may be disposed outside of the 3D image sensor module 2000. The image sensor 2062 may be implemented using a CMOS image sensor (CIS) or the like. The image sensor 2062 may sense a plurality of optical modulation signals MLIT# and output the sensed optical modulation signals in units of frames. As described above, each of the plurality of optical modulation signals MLIT# may be processed into a separate frame. The image processor 2064 may generate the image data IMG including depth image D_inf from a frame corresponding to each optical modulation signal MLIT#.

As such, the incident light ILIT output by the light source 2110 is reflected by the subject, an optical modulation signal MLIT# is generated from reflected light RLIT, and image data IMG is generated from the optical modulation signal MLIT#. Accordingly, generation of accurate image data IMG may be determined depending on whether phase modulation of the light source 2110 synchronizes with phase modulation of the optical shutter 2020. According to one or more exemplary embodiments, the frequency divider 2080 divides the oscillation frequency fout, which is the driving voltage Vdrv, to generate the clock signal CLK, and, therefore, the clock signal CLK that is used in the light source 2110 is synchronized with the driving voltage Vdry that is used in an operation of the optical shutter 2020. Thus a more accurate image may be generated.

Figure 22:
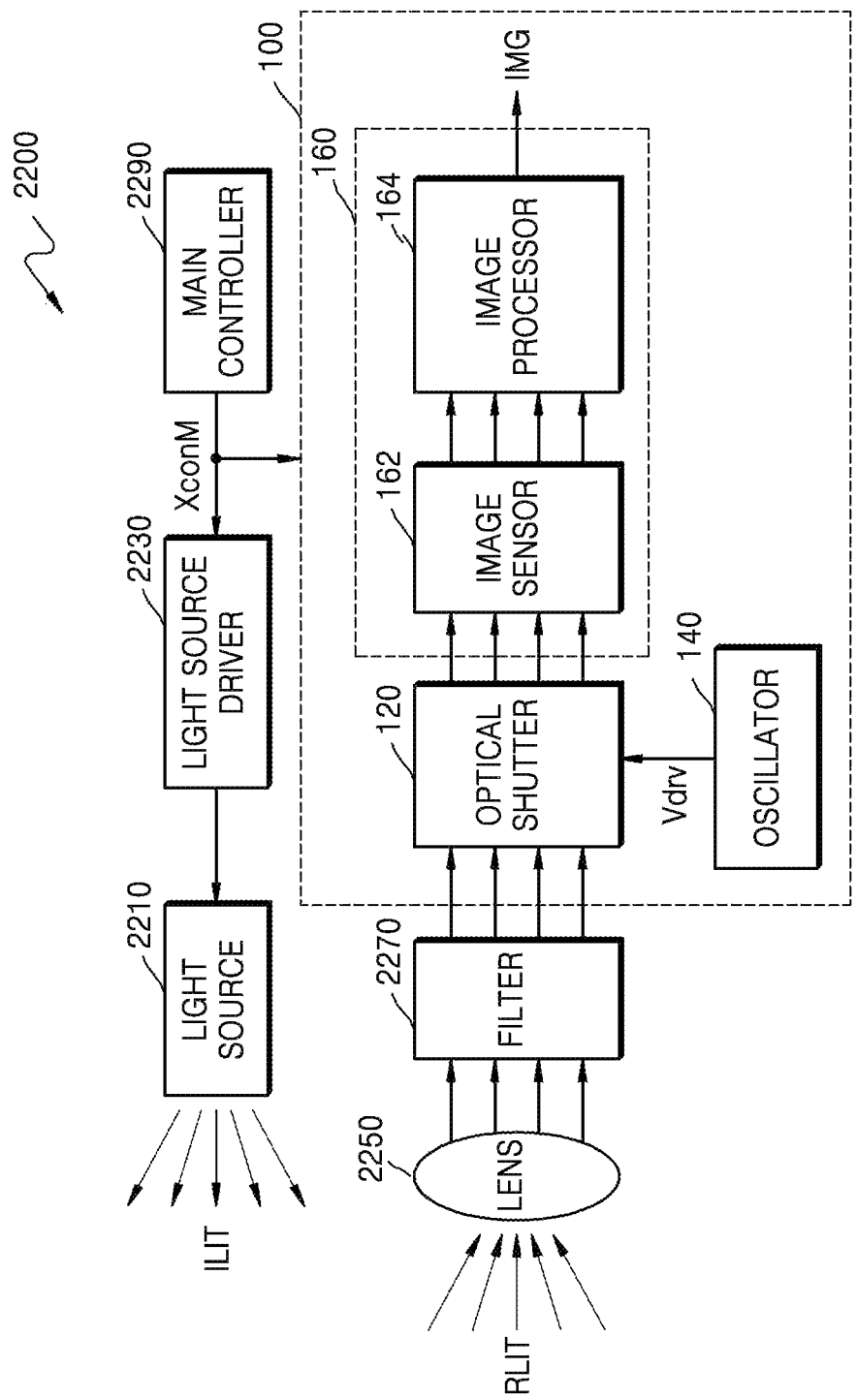

FIG. 22 is a block diagram of an electronic apparatus according to another embodiment. The electronic apparatus 2200 of FIG. 22 may include the 3D image sensor module 100 of FIG. 1. The other components of the electronic apparatus 2200 of FIG. 22, namely, a light source 2210, a light source driver 2230, a lens 2250, a filter 2270, and a main controller 2290, may be similar to those of FIG. 21. However, since the electronic apparatus 2200 of FIG. 22 does not include the frequency divider 2080, a special external clock signal may be received. The electronic apparatus 2200 of FIG. 22 may further include the temperature sensor 1890 or the feature information storage 1990.

Figure 23:
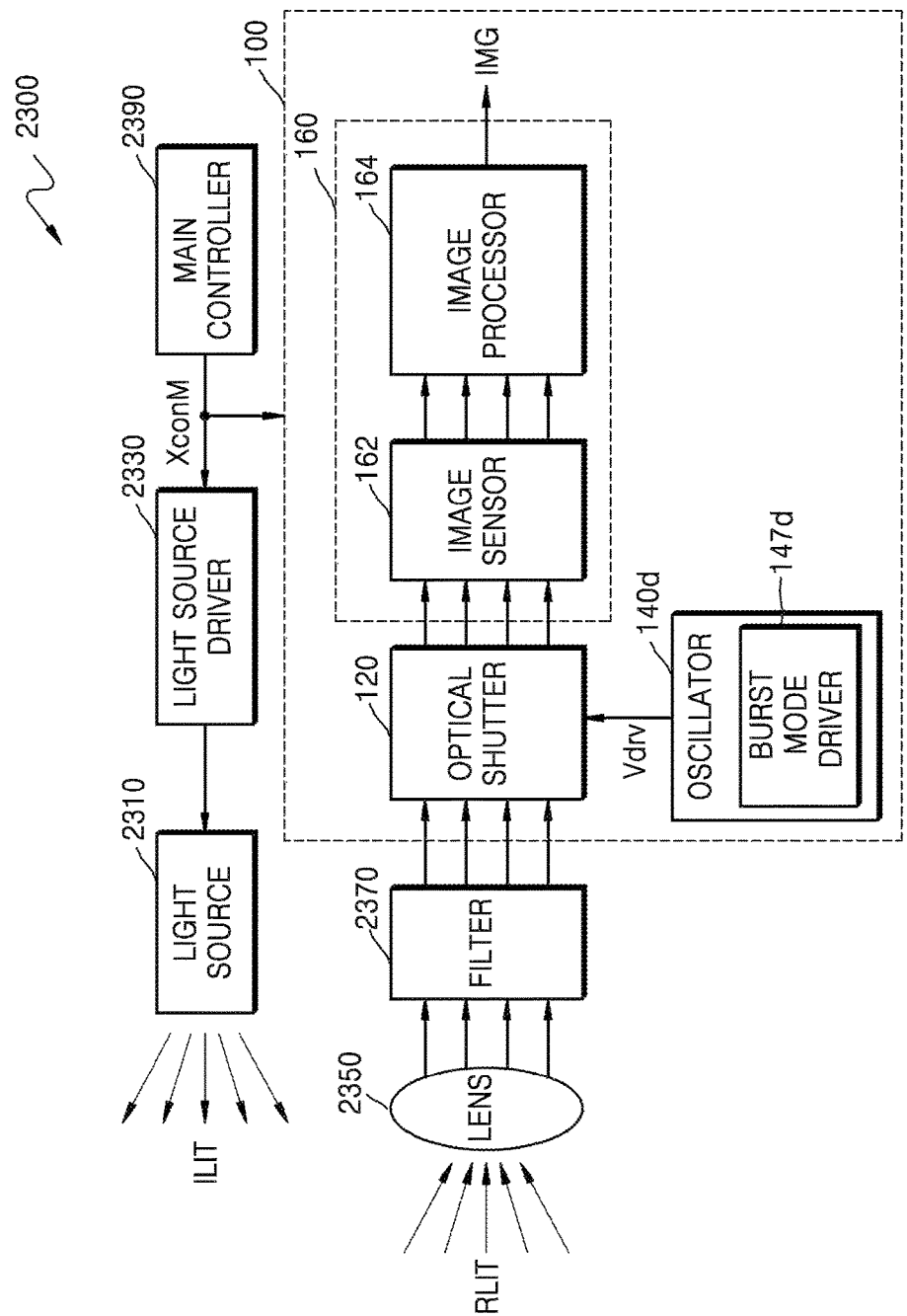

FIG. 23 is a block diagram of an electronic apparatus 2300 according to another exemplary embodiment. Referring to FIG. 23, the electronic apparatus 2300 may include a light source 2310, a light source driver 2330, a lens 2350, a filter 2370, a main controller 2390, and the 3D image sensor module 100. The light source 2310, the light source driver 2330, the lens 2350, the filter 2370, and the main controller 2390 may be similar to the light source 2110, the light source driver 2130, the lens 2150, the filter 2170, and the main controller 2190 of FIG. 21. An oscillator 140d of the 3D image sensor module 100 may include a burst mode driver 147d.

Figure 24:
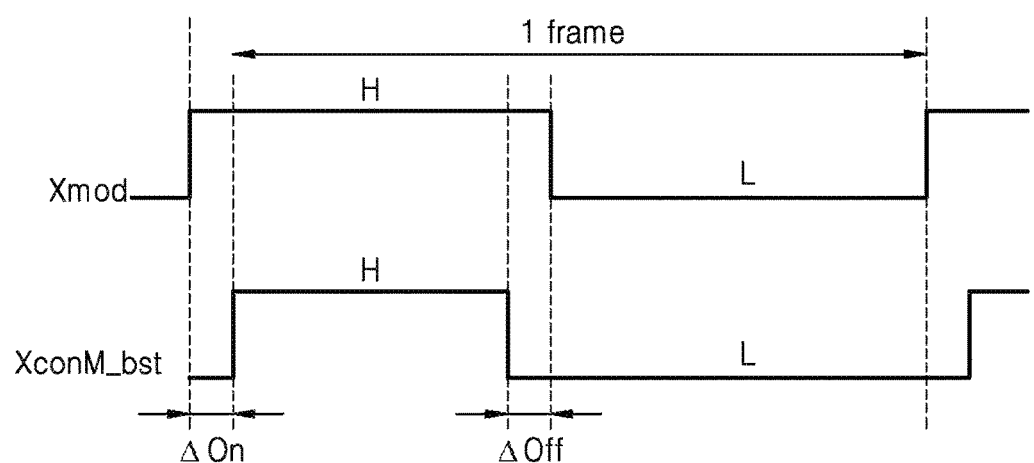
FIG. 24 is a diagram illustrating a burst mode operation of an electronic apparatus according to an exemplary embodiment.

FIG. 24 illustrates a burst mode operation in an electronic apparatus according to an exemplary embodiment, In a burst mode, the main controller 2390 may set a mode signal Xmod, which is supplied to the burst mode driver 147d, and a burst control signal XconM_bst, which is supplied to the light source 2310, so that a period of a logic high (H) level of the burst control signal XconM_bst is less than a period of a logic high (H) level of the mode signal Xmod. The burst control signal XconM_bst may be generated by applying an on-delay ΔOn and an off-delay ΔOff to the burst mode control signal XconM_bst before and after the mode signal Xmod transitions. Accordingly, when the electronic apparatus 2300 operates in a burst mode, a calculation error of the depth information D_inf, which may occur due to a transition period of the optical shutter 2320, may be reduced. The electronic apparatus 2300 of FIG. 23 may further include the frequency divider 2080, the temperature sensor 1890, or the feature information storage 1990.

Figure 25:
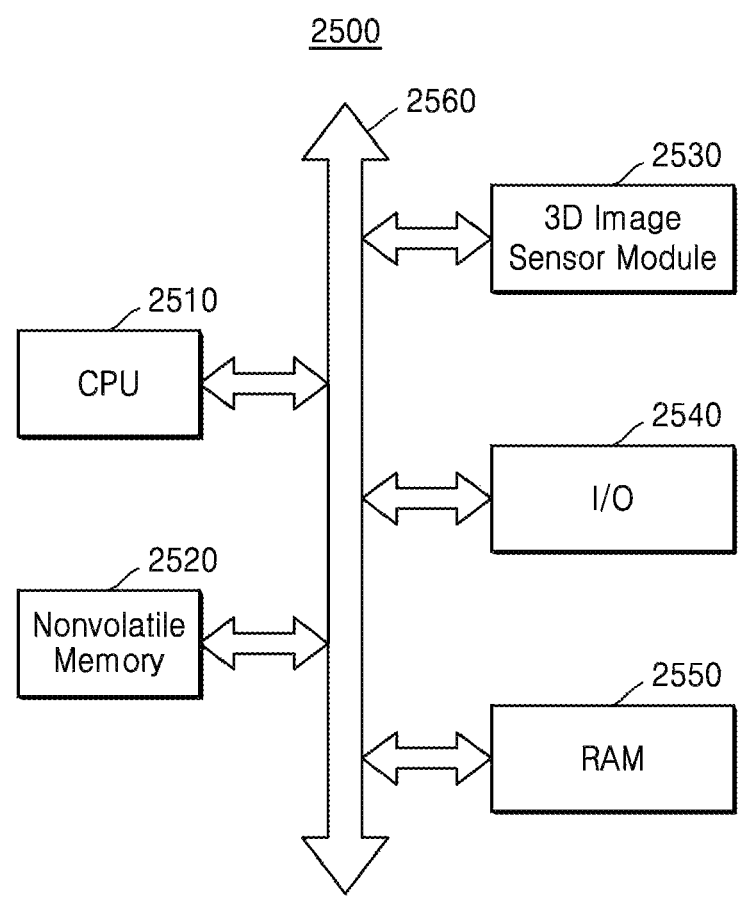
FIGS. 25 and 26 are block diagrams of electronic apparatuses according to various embodiments.

FIG. 25 is a block diagram of an electronic apparatus 2500 according to another exemplary embodiment. The electronic apparatus 2500 of FIG. 25 may include a central processing unit (or processor) (CPU) 2510, a nonvolatile memory 2520, a 3D image sensor module 2530, an input/output (I/O) device 2540, i.e., an I/O interface, a user interface, or an I/O device, and a random access memory (RAM) 2550. The CPU 2510 may communicate with the nonvolatile memory 2520, the 3D image sensor module 2530, the I/O device 2540, and the RAM 2550 via a bus 2560. The 3D image sensor module 2530 may be implemented by using an independent semiconductor chip or may be integrated with the CPU 2510 to obtain a single semiconductor chip. As described above, the 3D image sensor module 2530 included in the electronic apparatus 2500 of FIG. 25 may reduce power consumption by using a distortion-compensated oscillation frequency as a driving voltage of an optical shutter, or may reduce power consumption and generate accurate image data.

Figure 26:
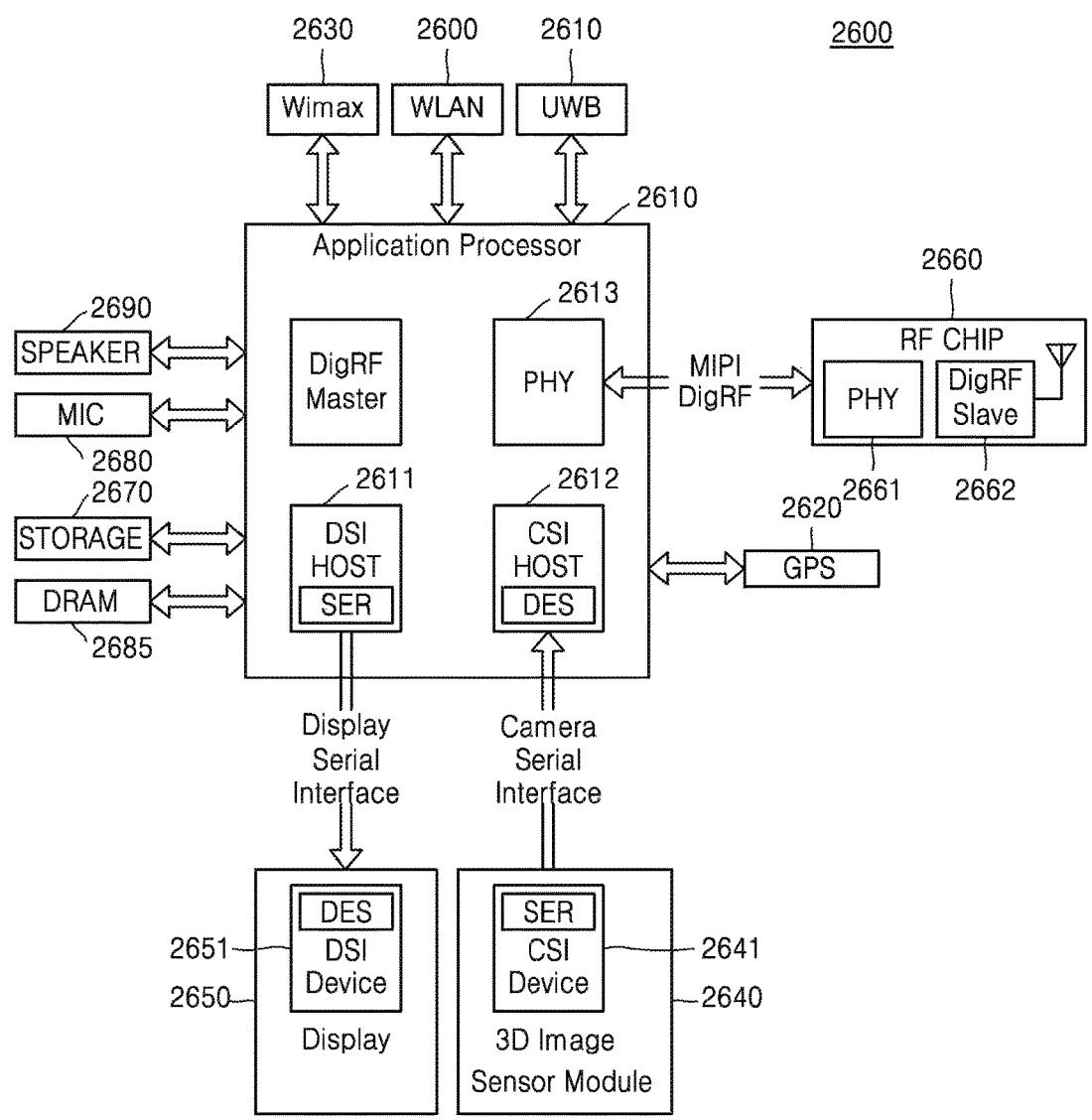

FIG. 26 is a block diagram of an electronic apparatus 2600 according to another embodiment. Referring to FIG. 26, the electronic apparatus 2600 may be implemented using a data processing apparatus capable of using or supporting a mobile industry processor interface (MIPI), for example, a mobile phone, a personal digital assistant (PDA), a portable multimedia player (PMP), or a smartphone. The electronic apparatus 2600 may include an application processor 2610, a 3D image sensor module 2640, and a display 2650.

A camera serial interface (CSI) host 2612 implemented in the application processor 2610 may serially communicate with a CSI apparatus 2641 of the 3D image sensor module 2640 through a CSI. In this case, an optical deserializer may be implemented in the CSI host 2612, and an optical serializer may be implemented in the CSI apparatus 2641. A display serial interface (DSI) host 2611 implemented in the application processor 2610 may serially communicate with a DSI apparatus 2651 of the display 2650 through a DSI. In this case, an optical serializer may be implemented in the DSI host 2611, and an optical deserializer may be implemented in the DSI apparatus 2651.

The electronic apparatus 2600 may further include a radio frequency (RF) chip 2660 that may communicate with the application processor 2610. A physical layer protocol (PHY) 2613 of the electronic apparatus 2600 and a PHY 2661 of the RF chip 2660 may send data to or receive data from each other according to an MIPI DigRF standard. The electronic apparatus 2600 may further include a global positioning system (GPS) 2620, a storage 2670, i.e., a memory, a microphone 2680, a dynamic random access memory (DRAM) 2685, and a speaker 2690. The electronic apparatus 2600 may communicate by using Wimax 2630, a wireless local area network (WLAN) 3100, and ultra-wideband (UWB) 3110.

The electronic apparatus according to one or more exemplary embodiments may be one of various electronic apparatuses, such as a television (TV), a smartphone, a camera, a tablet personal computer (PC), a game console, and a wearable device. Additionally, the electronic apparatus according to one or more exemplary embodiments may be used as an industrial measuring apparatus to measure a distance to an object.

According to the 3D image sensor module according to one or more exemplary embodiments and the electronic apparatus including the 3D image sensor module, a driving voltage, which is used when an optical shutter modulates light that is reflected from a subject, may be generated from a distortion-compensated oscillation frequency, and, thus, power consumption may be reduced.

The one or more exemplary embodiments described above should be considered in descriptive sense only and not for purposes of limitation. Descriptions of features or aspects within each exemplary embodiment should typically be considered as available for other similar features or aspects in other exemplary embodiments.

While one or more exemplary embodiments have been shown and described with reference to the drawings, it will be understood by those of ordinary skill in the art that various changes in form and details may be made therein without departing from the spirit and scope of the present invention as defined by the following claims and their equivalents.

What is claimed is:

1. A three-dimensional (3D) image sensor module comprising:
an oscillator configured to output a distortion-compensated oscillation frequency as a driving voltage of a sine wave that is biased with a bias voltage;
an optical shutter configured to:
receive the output driving voltage from the oscillator; and
vary transmittance of reflective light that is reflected from a subject, based on the received driving voltage, to modulate the reflective light into at least two optical modulation signals having different phases;
an image sensor configured to receive, from the optical shutter, the at least two optical modulation signals into which the reflective light is modulated; and
an image processor configured to generate image data of the subject, the image data comprising depth information that is determined based on a difference between the different phases of the received at least two optical modulation signals,
wherein the oscillator comprises:
a resonator configured to resonate via an energy exchange with the optical shutter to generate the driving voltage;
an energy supplementer configured to supply, to the resonator, replacement energy corresponding to an amount of energy lost during the energy exchange between the resonator and the optical shutter; and
a distortion compensator configured to compensate for a distortion of the replacement energy supplied by the energy supplementer to the resonator.

2. The 3D image sensor module of claim 1, wherein the distortion compensator is connected to the energy supplementer so that the distortion compensator is further configured to prevent the energy supplementer from blocking the driving voltage from swinging to a negative value.

3. The 3D image sensor module of claim 1, wherein the optical shutter comprises a first end and a second end, and the resonator comprises:
an inductor comprising a first end connected to the first end of the optical shutter, and a second end; and a capacitor comprising a first end connected to the second end of the inductor, and a second end connected to the bias voltage and the second end of the optical shutter.

4. The 3D image sensor module of claim 3, wherein the energy supplementer is further configured to supply energy to the capacitor via the inductor when energy is exchanged between the capacitor and the optical shutter.

5. The 3D image sensor module of claim 3, wherein the energy supplementer comprises:
- a first switching element comprising a first end connected to a power supply terminal, a second end connected to the first end of the inductor, and a gate connected to the second end of the inductor, the first switching element being configured to be switched by a voltage on the second end of the inductor;
- a second switching element comprising a first end connected to the power supply terminal, a second end connected to the second end of the inductor, and a gate connected to the first end of the inductor, the second switching element being configured to be switched by a voltage on the first end of the inductor;
- a third switching element comprising a first end connected to the first end of the inductor, a second end, and a gate connected to the second end of the inductor, the third switching element being configured to be switched by the voltage on the second end of the inductor; and
- a fourth switching element comprising a first end connected to the second end of the inductor, a second end connected to the second end of the third switching element, and a gate connected to first end of the inductor, the fourth switching element being configured to be switched by the voltage on the first end of the inductor.

6. The 3D image sensor module of claim 5, wherein the first switching element and the fourth switching element are configured to, when energy is moved from the capacitor to the optical shutter via the inductor, be turned on to supply energy to the capacitor, and
the second switching element and the third switching element are configured to, when energy is moved from the optical shutter to the capacitor via the inductor, be turned on to supply energy to the capacitor.

7. The 3D image sensor module of claim 5, wherein the first switching element and the second switching element comprise respective p-type metal-oxide-semiconductor (PMOS) transistors, and
the third switching element and the fourth switching element comprise respective n-type metal-oxide-semiconductor (NMOS) transistors.

8. The 3D image sensor module of claim 5, wherein the distortion compensator comprises at least one resistor comprising a first end connected to the second end of the third switching element and the second end of the fourth switching element, and second end connected to a ground terminal, and
the distortion compensator is further configured to balance a mismatch between driving capabilities of the third switching element and the fourth switching element.

9. The 3D image sensor module of claim 5, wherein the distortion compensator comprises:
- a first compensator comprising a first end connected to the first end of the inductor, and a second end: and
- a second compensator comprising a first end connected to the second end of the inductor, and a second end, the first end of the third switching element is connected to the second end of the first compensator to connect to the first end of the inductor via the first compensator, and
the first end of the fourth switching element is connected to the second end of the second compensator to connect to the second end of the inductor via the second compensator.

10. The 3D image sensor module of claim 9, wherein the first compensator comprises a first diode configured to supply a current from the first end of the inductor to the third switching element, and
the second compensator comprises a second diode configured to supply a current from the second end of the inductor to the fourth switching element.

11. The 3D image sensor module of claim 1, wherein the oscillator further comprises a burst mode driver configured to output a burst signal indicating that the 3D image sensor module is operating in a burst mode, and
the energy supplementer is further configured to, in response to receiving the burst signal, interrupt the supply of the replacement energy to the resonator.

12. The 3D image sensor module of claim 1, further comprising a first controller configured to detect the output driving voltage to generate a control signal,
wherein the oscillator is further configured to control the supply of the replacement energy to the resonator, based on the control signal.

13. The 3D image sensor module of claim 1, further comprising:
- a temperature sensor configured to sense a temperature of the 3D image sensor module, and generate temperature information, based on the sensed temperature; and
- a controller configured to generate a control signal, based on the temperature information, wherein the oscillator is further configured to control the supply of the replacement energy to the resonator, based on the control signal.

14. The 3D image sensor module of claim 1, further comprising:
- a memory configured to store feature information corresponding to operational features of the 3D image sensor module; and
- a controller configured to generate a control signal, based on the feature information, wherein the oscillator is further configured to control the supply of the replacement energy to the resonator, based on the control signal.

15. The 3D image sensor module of claim 1, wherein the optical shutter comprises:
- a first electrode to which the output driving voltage is to be supplied;
- a second electrode to which the output driving voltage is to be supplied;
- a first semiconductor layer disposed between the first electrode and the second electrode;
- a second semiconductor layer disposed between the first electrode and the second electrode; and
- a multiple quantum well disposed between the first semiconductor layer and the second semiconductor layer, and the first electrode, the first semiconductor layer, the multiple quantum well, the second semiconductor layer, and the second electrode are layered in order.

16. The 3D image sensor module of claim 1, wherein the optical shutter is further configured to modulate the reflective light into four optical modulation signals having phases of 0 degrees, 90 degrees, 180 degrees, and 270 degrees, respectively.

17. An apparatus configured to measure the subject, the apparatus comprising the 3D image sensor module of claim 16.

18. The 3D image sensor module of claim 1, wherein the image sensor is further configured to sense each of the received at least two optical modulation signals, generate an electrical signal corresponding to the sensed at least two optical modulation signals, and output the electrical signal in units of frames, and
the image processor is further configured to determine the depth information, based on a difference between phases of respective frames of the at least two optical modulation signals.

19. The 3D image sensor module of claim 1, further comprising a frequency divider configured to divide the oscillation frequency that is received from the oscillator to generate a clock signal,
wherein the image processor is further configured to generate the image data in synchronization with the clock signal.

20. The 3D image sensor module of claim 1, further comprising:
a light source configured to emit incident light beams to the subject;
a light source driver configured to drive the light source so that the incident light beams have different phases;
a lens configured to focus the reflective light; and
a filter configured to filter the focused reflective light, using a same wavelength band as a bandwidth of the incident light beams, and supply a result of the filtering to the optical shutter.

21. An electronic apparatus comprising the 3D image sensor module of claim 1.

22. The 3D image sensor module of claim 1 further comprising a plurality of optical shutters.

23. A 3D image sensor module comprising:
an oscillator comprising a differential LC voltage controlled oscillator (VCO), the differential LC VCO comprising a first end connected to a power supply terminal, and the oscillator being configured to output a distortion-compensated oscillation frequency as a driving voltage of a sine wave that is biased with a bias voltage;
an optical shutter configured to:
receive the output driving voltage from the oscillator; and
vary transmittance of reflective light that is reflected from a subject, based on the received driving voltage, to modulate the reflective light into at least two optical modulation signals having different phases; and
an image sensor configured to:
receive, from the optical shutter, the at least two optical modulation signals into which the reflective light is modulated; and
output at least two electrical signals corresponding to the received at least two optical modulation signals in units of frames,
wherein the oscillator further comprises:
a resonator configured to resonate via an energy exchange with the optical shutter to generate the driving voltage;
an energy supplementer configured to supply, to the resonator, replacement energy corresponding to an amount of energy lost during the energy exchange between the resonator and the optical shutter; and
a distortion compensator configured to compensate for a distortion of the replacement energy supplied by the energy supplementer to the resonator.

24. The 3D image sensor module of claim 23, wherein the optical shutter comprises a first end and a second end, and the differential LC VCO comprises:
an inductor comprising a first end connected to the first end of the optical shutter, and a second end;
a capacitor comprising a first end connected to the second end of the inductor, and a second end connected to the bias voltage and the second end of the optical shutter;
a first p-type metal-oxide-semiconductor (PMOS) transistor comprising a first end connected to a power supply terminal, a second end connected to the first end of the inductor, and a gate connected to the second end of the inductor, the first PMOS transistor being gated by a voltage on the second end of the inductor;
a second PMOS transistor comprising a first end connected to the power supply terminal, a second end connected to the second end of the inductor, and a gate connected to the first end of the inductor, the second PMOS transistor being gated by a voltage on the first end of the inductor;
a first n-type metal-oxide-semiconductor (NMOS) transistor comprising a first end connected to the first end of the inductor, a second end, and a gate connected to the second end of the inductor, the first NMOS transistor being gated by the voltage on the second end of the inductor; and
a second NMOS transistor comprising a first end connected to the second end of the inductor, a second end connected to the second end of the first NMOS transistor, and a gate connected to first end of the inductor, the second NMOS transistor being gated by the voltage on the first end of the inductor.

25. The 3D image sensor module of claim 24, further comprising:
a first diode comprising a first end connected to the first end of the inductor, and a second end; and
a second diode comprising a first end connected to the second end of the inductor, and a second end,
wherein the first end of the first NMOS transistor is connected to the second end of the first diode to connect to the first end of the inductor via the first diode, and
the first end of the second NMOS transistor is connected to the second end of the second diode to connect to the second end of the inductor via the second diode.

26. The 3D image sensor module of claim 24, wherein the differential LC VCO further comprises at least one resistor comprising a first end connected the second end of the first NMOS transistor and the second end of the second NMOS transistor, the at least one resistor being configured to decrease a voltage on the second end of the first NMOS transistor when the driving voltage swings to a negative value, and block a flow of a current from the second end of the first NMOS transistor to the first end of the first NMOS transistor.

27. The 3D image sensor module of claim 24, wherein the oscillator further comprises a third NMOS transistor configured to interrupt a power supply to the resonator in response to a burst signal instructing that an operation of the 3D image sensor module be performed in a burst mode.

28. The 3D image sensor module of claim 27, wherein the third NMOS transistor is connected between a ground terminal and a current source for supplying a reference current that is a basis for generating a power supply current that is supplied to the power supply terminal, the third NMOS transistor being gated by the burst signal.

29. The 3D image sensor module of claim 27, wherein the oscillator further comprises:
  a fourth NMOS transistor connected between the first end of the inductor and a ground terminal, the fourth NMOS transistor being gated by the burst signal; and
  a fifth NMOS transistor connected between the second end of the inductor and a ground terminal, the fifth NMOS transistor being gated by the burst signal.

30. The 3D image sensor module of claim 23, further comprising a first controller configured to detect the output driving voltage to generate a control signal,
  wherein the oscillator is further configured to control a supply of energy to the differential LC VCO, based on the control signal.

31. The 3D image sensor module of claim 23, further comprising a frequency divider configured to divide the oscillation frequency that is received from the oscillator to generate a clock signal,
  wherein the image sensor is further configured to output the received at least two electrical signals in units of frames in synchronization with the clock signal.

32. A method of sensing depth information of a subject, the method comprising:
  outputting, by an oscillator, a distortion-compensated oscillation frequency as a driving voltage of a sine wave that is biased with a bias voltage;
  receiving, by an optical shutter, the output driving voltage from the oscillator;
  varying, by the optical shutter, a transmittance of reflective light that is reflected from the subject, based on the received driving voltage, to modulate the reflective light into at least two optical modulation signals having different phases;
  receiving, by an image sensor, the at least two optical modulation signals into which the reflective light is modulated, from the optical shutter;
  determining, by an image processor, depth information, based on a difference between the different phases of the received at least two optical modulation signals; and
  generating, by the image processor, image data of the subject, the image data comprising the determined depth information,
  wherein the outputting comprises:
    resonating, by a resonator, via an energy exchange with the optical shutter to generate the driving voltage;
    supplying, by an energy supplemener, to the resonator, replacement energy corresponding to an amount of energy lost during the energy exchange between the resonator and the optical shutter; and
    compensating, by a distortion compensator, for a distortion of the replacement energy supplied by the energy supplementer to the resonator.

33. The method of claim 32, further comprising:
  generating, by the oscillator, the distortion-compensated oscillation frequency as the driving voltage of the sine wave biased with the bias voltage; and
  generating, by a frequency divider, a clock signal by dividing the oscillation frequency,
  wherein the determining of the depth information comprises determining, by the image processor, the depth information in synchronization with the clock signal.

* * * * *